(12) United States Patent
Carpentier et al.

(10) Patent No.: US 8,261,066 B2
(45) Date of Patent: *Sep. 4, 2012

(54) SYSTEM AND METHOD FOR SECURE STORAGE, TRANSFER AND RETRIEVAL OF CONTENT ADDRESSABLE INFORMATION

(75) Inventors: Paul R. Carpentier, Boechout (BE); Jan F. Van Riel, Geel (BE); Tom Teugels, Schoten (BE)

(73) Assignee: EMC Corporation, Hopkinton, MA (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/094,026

(22) Filed: Mar. 30, 2005

(65) Prior Publication Data
US 2005/0172124 A1 Aug. 4, 2005

Related U.S. Application Data

(63) Continuation of application No. 09/391,360, filed on Sep. 7, 1999, now Pat. No. 6,976,165.

(51) Int. Cl.
*H04L 29/06* (2006.01)
(52) U.S. Cl. .................................. 713/165; 707/698
(58) Field of Classification Search .............. 707/1–9, 707/100, 102, 103 R, 103 Y, 103 Z, 200, 707/202–203, 212; 709/212–216; 726/3–4, 726/18–19
See application file for complete search history.

(56) References Cited

U.S. PATENT DOCUMENTS
5,202,982 A 4/1993 Gramlick et al.
(Continued)

FOREIGN PATENT DOCUMENTS
GB 2 294 132 A 4/1996
(Continued)

OTHER PUBLICATIONS

Bosselaers et al., "The RIPMED-160 Cryptographic Hash Function", Dr. Dobb's Journal, Jan. 1997.
(Continued)

*Primary Examiner* — Kim Vu
*Assistant Examiner* — Leynna Truvan
(74) *Attorney, Agent, or Firm* — Krishnendu Gupta; Robert Kevin Perkins; Joseph D'Angelo

(57) ABSTRACT

An algorithm (such as the MD5 hash function) is applied to a file to produce an intrinsic unique identifier (IUI) for the file (or message digest). The file is encrypted using its IUI as the key for the encryption algorithm. An algorithm is then applied to the encrypted file to produce an IUI for the encrypted file. The encrypted file is safely stored or transferred within a network and is uniquely identifiable by its IUI. The encrypted file is decrypted using the IUI of the plaintext file as the key. The IUI serves as both a key to decrypt the file and also as verification that the integrity of the plaintext file has not been compromised. IUIs for any number of such encrypted files may be assembled into a descriptor file that includes meta data for each file, the IUI of the plaintext file and the IUI of the encrypted file. An algorithm is applied to the descriptor file to produce an IUI for the descriptor file. The plaintext descriptor file is then encrypted using the descriptor file IUI as a key for the encryption algorithm. An algorithm is applied to the encrypted descriptor file to produce an IUI for the encrypted descriptor file. The IUI of the encrypted descriptor file is a location-independent identifier to locate the encrypted descriptor file. A flattened descriptor file includes the IUIs of encrypted data files and the IUI of the encrypted descriptor file. An algorithm is applied to the flattened descriptor file to produce its own IUI.

57 Claims, 17 Drawing Sheets

U.S. PATENT DOCUMENTS

| | | | |
|---|---|---|---|
| 5,404,508 A | | 4/1995 | Konrad et al. |
| 5,581,764 A | | 12/1996 | Fitzgerald et al. |
| 5,600,834 A | | 2/1997 | Howard |
| 5,659,599 A | | 8/1997 | Arumainayagam et al. |
| 5,689,706 A | * | 11/1997 | Rao et al. .................. 707/201 |
| 5,694,596 A | | 12/1997 | Campbell |
| 5,701,316 A | | 12/1997 | Alferness et al. |
| 5,710,922 A | | 1/1998 | Alley et al. |
| 5,742,807 A | | 4/1998 | Masinter |
| 5,754,844 A | * | 5/1998 | Fuller .............................. 707/6 |
| 5,757,915 A | | 5/1998 | Aucsmith et al. |
| 5,907,619 A | | 5/1999 | Davis |
| 5,991,414 A | | 11/1999 | Garay et al. |
| 6,115,717 A | * | 9/2000 | Mehrotra et al. ............ 707/102 |
| 6,173,272 B1 | * | 1/2001 | Thomas et al. ................ 705/42 |
| 6,181,336 B1 | * | 1/2001 | Chiu et al. .................... 715/736 |
| 6,539,373 B1 | | 3/2003 | Guha |
| 6,947,959 B1 | * | 9/2005 | Gill .............................. 715/202 |
| 6,959,288 B1 | * | 10/2005 | Medina et al. ................. 705/51 |
| 7,269,564 B1 | * | 9/2007 | Milsted et al. ................... 705/1 |
| 2002/0002485 A1 | | 1/2002 | O'Brien et al. |
| 2002/0019935 A1 | | 2/2002 | Andrew et al. |

FOREIGN PATENT DOCUMENTS

| | | |
|---|---|---|
| WO | 96/32685 | 10/1996 |
| WO | 97/43717 | 11/1997 |
| WO | 99/38092 | 7/1999 |
| WO | 99/38093 | 7/1999 |

OTHER PUBLICATIONS

Fowler, et al., "A User-Level Replicated File System", Jun. 21-25, 1993, Usenix Summer 1993 Technical Conference.

Andrew Gore, "FileWave agents across Atlantic", Mar. 29, 1993, MACWEEK.

Greene, et al., "Multi-Index Hashing for Information Retrieval", Nov. 20-22, 1994, Proceedings, 35$^{th}$ Annual Symposium on Foundations of Computer Science, IEEE.

Robert Hess, "FileRunner gets in sync with MAC", May 3, 1993, MACWEEK.

Hirano et al., "Improved Extendible Hashing with High Concurrency", 1995, Systems and Computers in Japan, vol. 26, No. 13.

Moore et al., "Why LIFNs?", Aug. 31, 1995, www.netlib.org.

Prusker et al., "The Siphon: Managing Distant Replicated Repositories", Nov. 8-9, 1990, Proceedings on the Management of Replicated Data, IEEE.

Rich et al., "Hobgoblin: A File and Directory Auditor", Sep. 30-Oct. 3, 1991, Lisa V, San Diego, CA.

* cited by examiner

Descriptor File Example

```xml
<?xml version='1.0'?>
<!DOCTYPE ecml SYSTEM "http://www.waveresearch.be/dtd/ecml.dtd">
<ecml version="2.0" compatibleversion="2.0">
   <eclipdescription>
      <meta name="type" value="Dell"/>
      <meta name="name" value="Encrypted Network Package"/>
      <meta name="comment" value="this is a comment"/>
      <meta name="author.name" value="Abraham Felsenstein"/>
      <meta name="author.email" value="syncromedia@ping.be"/>
      <meta name="encoding" value="StandardCrypt"/>
      <meta name="compatibletype" value="Standard"/>
      <meta name="numfiles" value="4"/>
      <meta name="numfolders" value="1"/>
      <meta name="totalsize" value="9011"/>
      <meta name="creation.date" value="1999.07.22 11:25:44 GMT+02:00"/>
      <meta name="author.organization" value=""/>
      <keyword name="Contract_ID" value="0005" namespace="dell"/>
      <keyword name="Contract_Name" value="Sales 005" namespace="dell"/>
      <keyword name="Contract_Destination" value="John Doe" namespace="dell"/>
   </eclipdescription><!---->
   <eclipcontents>
      <hfml>
         <folder name="net" winattributes.readonly="false" winattributes.hidden="false" winattributes.system="false" winattributes.archive="false" winattributes.temp="false">
            <file name="FtpClient.class" size="3648" md5="FVHLQCT1TFJ62x4ULSLQF94ILRP" decoded.md5="3SBUVEESBOAVLxB061D0E518E7G" decoded.size="7064" whenmodified="1999.06.14 13:20:50 GMT+02:00" whencreated="1999.07.22 11:03:31 GMT+02:00" winattributes.readonly="false" winattributes.hidden="false" winattributes.system="false" winattributes.archive="true" winattributes.temp="false"/>
            <file name="FtpInputStream.class" size="560" md5="CSVINULL4RDSQx447NTI4T4BQGB" decoded.md5="A5UUO28DBF7V9xDGOD31VMOH24E" decoded.size="978" whenmodified="1999.06.14 13:20:50 GMT+02:00" whencreated="1999.07.22 11:03:31 GMT+02:00" winattributes.readonly="false" winattributes.hidden="false" winattributes.system="false" winattributes.archive="true" winattributes.temp="false"/>
            <file name="FtpLoginException.class" size="320" md5="2IIKCDL66E173x0MF09R0E7IHH1" decoded.md5="C1KHALJ3VDILOxF8QJ3PDPLJTUL" decoded.size="491" whenmodified="1999.06.14 13:20:50 GMT+02:00" whencreated="1999.07.22 11:03:32 GMT+02:00" winattributes.readonly="false" winattributes.hidden="false" winattributes.system="false" winattributes.archive="true" winattributes.temp="false"/>
            <file name="FtpProtocolException.class" size="320" md5="ARC34P9F68KA9xA4ECG9O3L0K42" decoded.md5="9UA8J446KV097x39EM0CJHDU5KI" decoded.size="478" whenmodified="1999.06.14 13:20:50 GMT+02:00" whencreated="1999.07.22 11:03:32 GMT+02:00" winattributes.readonly="false" winattributes.hidden="false" winattributes.system="false" winattributes.archive="true" winattributes.temp="false"/>
         </folder><!--net-->
      </hfml><!---->
   </eclipcontents><!---->
</ecml><!---->
```

FIG. 6A

Descriptor File Example

```xml
<?xml version='1.0'?>
<!DOCTYPE ecml SYSTEM "http://www.waveresearch.be/dtd/ecml.dtd">
<ecml version="2.0" compatibleversion="2.0">
  <eclipdescription>
    <meta name="type" value="Dell"/>
    <meta name="name" value="Encrypted Network Package"/>
    <meta name="comment" value="this is a comment"/>
    <meta name="author.name" value="Abraham Felsenstein"/>
    <meta name="author.email" value="syncromedia@ping.be"/>
    <meta name="encoding" value="StandardCrypt"/>
    <meta name="compatibletype" value="Standard"/>
    <meta name="numfiles" value="4"/>
    <meta name="numfolders" value="1"/>
    <meta name="totalsize" value="9011"/>
    <meta name="creation.date" value="1999.07.22 11:25:44 GMT+02:00"/>
    <meta name="author.organization" value=""/>
    <keyword name="Contract_ID" value="0005" namespace="dell"/>
  </eclipdescription><!---->
  <eclipcontents>
    <keyfile md5="82F04VM1EQJSDx1UJ4G9V3TT57E" size="896" whenmodified="1999.07.22 11:25:44 GMT+02:00"/>
    <file md5="FVHLQCT1TFJ62x4ULSLQF94ILRP" size="3648" whenmodified="1999.06.14 13:20:50 GMT+02:00"/>
    <file md5="CSVINULL4RDSQx447NTI4T4BQGB" size="560" whenmodified="1999.06.14 13:20:50 GMT+02:00"/>
    <file md5="2IIKCDL66E173x0MF09R0E7IHH1" size="320" whenmodified="1999.06.14 13:20:50 GMT+02:00"/>
    <file md5="ARC34P9F68KA9xA4ECG9O3L0K42" size="320" whenmodified="1999.06.14 13:20:50 GMT+02:00"/>
  </eclipcontents><!---->
  <ecliporigin clipboxid="040-762-05-413-6338" clipboxcount="9" seatid="c7cd7b12-bcdf-11d2-b045-00400569895e">
  </ecliporigin><!---->
  <eclipsignature digest="qliWJo2zuqBcRTgTrHD4Kg=="/>
</ecml><!---->
```

FIG. 6B
Flattened Descriptor File Example

Access Control Example

Escrow Example

SYSTEM AND METHOD FOR SECURE STORAGE, TRANSFER AND RETRIEVAL OF CONTENT ADDRESSABLE INFORMATION

This application is a continuation of prior application Ser. No. 09/391,360, filed Sep. 7, 1999 now U.S. Pat. No. 6,976,165 entitled SYSTEM AND METHOD FOR SECURE STORAGE, TRANSFER AND RETRIEVAL OF CONTENT ADDRESSABLE INFORMATION.

FIELD OF THE INVENTION

The present invention relates generally to the secure storage, transfer and retrieval of information using a computer. More specifically, the present invention relates to a technique for identifying information using an intrinsic unique identifier and for securely storing, transferring and retrieving that information using related techniques.

BACKGROUND OF THE INVENTION

Digital information (such as a computer file) must often be identified to be in a particular state, denoted by the status of the information as of some event or time. Digital information is highly subject to change; normal attempts to improve the content, inadvertent commands or actions which change the content, or tampering by others are difficult to detect.

Another problematic attribute of digital information is that copies may exist which are identical in content but differ in the meta data that the computer system uses to describe the digital information. Such meta data includes the date/time recorded for the creation or last modification of the file and the file name. The meta data may imply that otherwise identical copies of digital information are different when in fact they are not. Such confusion makes it difficult to avoid unnecessary duplication of content on a single computer or on a collection of computers on a network. The inability of systems to reliably distinguish different versions of files with the same identifier or to recognize identical files with different identifiers wastes network resources and creates confusion when files are transferred between users of a network.

Further, data on computer systems can generally only be accessed through identifiers which to a greater or lesser extent include information about the location of the file in the storage of the computer. For example, files within a sub-directory are at risk if someone changes the sub-directory name. If changed, the path to a file becomes invalid, and all of the stored or remembered names of files become invalid as well.

Finally, it is inconvenient for computer users to identify collections of specific versions of digital files. It would be desirable for users to refer to collections of specific copies or versions of digital files without creating a new entity which incorporates copies of the files into a new form. Many mechanisms have been created to combine such copies into what are commonly called archive files. Such solutions create additional copies which are often proliferated to many systems. The difficulty is that digital copies of many of the files in an archive are already present on the systems to which they are copied, which is wasteful and potentially confusing.

One result is that duplicate copies of digital files are frequently stored on computer storage devices (at expense to the owner of the system) or transferred via telecommunications devices (at further expense to the system owner and the telecommunications provider). This duplication strains limited resources and causes needless confusion on local networks and on collections of systems connected by telecommunication networks.

To address various of these problems, unique solutions have been presented in U.S. patent application Ser. Nos. 09/236,366 and 09/235,146, filed Jan. 21, 1999 in the name of Carpentier et al. each of which is incorporated by reference herein, in its entirety. In one embodiment of these inventions, a technique as shown in FIG. 1 is used. FIG. 1 illustrates a technique by which a number of files are uniquely represented by an identifier for later retrieval. As shown in FIG. 1, the cryptographic hash junction known as the MD5 algorithm (as on example) is applied to the contents of the file A to produce a unique identifier 20 for that file which is referred to as MD5 A. The algorithm is also applied to files B and C to produce unique identifiers 22 and 24. Next, a descriptor file 30 is created that includes meta data 32 that describes high level information concerning the files (such as the folders in which they are enclosed, time stamps, size, etc.) and information for each file. In one embodiment, the information for each file includes the file name 34, file meta data 36 (such as time stamp, size, etc.) and the recently calculated MD5 20 for the file. As shown, such information may be included for each of the other files. Next, the MD5 algorithm may be applied to descriptor file 30 to produce a unique identifier 40 for descriptor file 30.

As described in the above patent applications, the unique identifier 40 for descriptor file 30 can be used to provide many advantages. For example, identifier 40 can be used to uniquely identify descriptor file 30, and in turn the identifiers 20-24 can then be used to uniquely identify files A, B and C. Accordingly, files A, B and C may be stored once anywhere on a network and may be eventually located, retrieved and identified using identifier 40 and descriptor file 30.

Although the above techniques have many advantages, and are extremely useful in certain applications, there is nonetheless room for improvement in the area of information management. As alluded to above, managing front office files and web-based information is a big problem with today's workers. Because data is referred to by breakable URLs and path names, the disadvantages are huge: data can be modified, corrupted, misplaced, and unreachable. As a result, valuable information is lost to an enterprise or its integrity becomes suspect.

More specifically, data protection relies on an extensive organization and expensive specialists to manage, backup and archive digital information. Locating and retrieving the right information from its exact location can be time consuming if not impossible because the information may be dispersed across various hard disks, file servers, and the Internet in duplicated forms and with a variety of hard-coded file names. Furthermore, sharing such information internally and externally can seriously degrade network performance, not to mention putting sensitive information at risk. Electronic mail attachments can be too large or take too long to transfer. A download from an FTP server or a web site may have to be started all over again if interrupted. The same exact download performed by a large number of users in one site can slow down the whole network. In addition, files are continually being modified, deleted, moved or misplaced, meaning that there is no certainty in the location of a file or in its data integrity. Thus, it is no surprise that workers themselves become responsible for managing their own data and saving versions of documents. Such efforts are extremely time consuming and may not always work.

Although the embodiments described in the above applications may address some of these problems, there are further issues that remain to be addressed. For example, if unique identifier 40 is either intercepted or otherwise obtained by an unscrupulous individual, that individual may then be able to retrieve descriptor file 30 which would then allow the individual to locate and retrieve files A, B and C. If these files contain sensitive or secret company information, there would then be a problem. In other words, the advantage provided by identifier 40 in that it can be used to uniquely locate a group of files can also be turned to a disadvantage if the wrong party obtains identifier 40 and gains access to sensitive information contained in the files. Furthermore, even though files A, B and C may be stored anywhere on a network in a location-independent manner, a secret file might still be stolen, viewed, and/or printed if it is not secured appropriately.

Thus, workers are called upon to secure their own data files. For example, a file may be stored in a computer in a physically secure location (such as in a locked room with only electronic access), the file may be electronically locked using a password or other operating system function, the file may be encoded, or some other security technique may be used. Thus, it is no surprise that workers themselves become responsible for managing the security of their own data, encrypting files, password-protecting files, hiding files and finally saving versions of files where they believe they are safe and can be located later. Placing the burden upon the worker to implement security for a particular file and then maintain that security over the life of the file is extremely onerous, expensive, and may not be foolproof.

Accordingly, a technique is desired that would provide efficient and near foolproof security for digital information and/or its respective unique identifiers. In particular, it would be desirable to have such a technique that works well with the embodiments described in the above patent applications; such a technique would provide a user with the assurance that not only can a file be uniquely identified, but also that the file can be kept secure from prying eyes and its integrity can be guaranteed.

SUMMARY OF THE INVENTION

In a first embodiment of the invention, an algorithm is applied to a file to produce an intrinsic unique identifier (IUI) for the file. To provide security for the file, the file is then encrypted using the recently produced IUI as a key for the encryption algorithm. The file may also be compressed in addition to being encrypted. An algorithm is then applied to the encrypted file to produce an IUI for the encrypted file. Thus, the encrypted file may be safely stored or transferred within a network and is uniquely identifiable by its IUI. An authorized party who obtains the encrypted file may then decrypt the encrypted file using the IUI of the plaintext file if he or she has access to this key. Using the IUI of the file to also serve as a key to encrypt the file provides many advantages. For example, a single identifier (in this case the IUI) serves as both a key to decrypt the file and also as verification that the integrity of the plaintext file has not been compromised. Further advantages and specific applications of this technique are presented below. In one specific embodiment, the MD5 algorithm is used to generate the IUI for the plaintext file. The resulting MD5 (the result of the hash function) may then be used to verify that the plaintext file has not changed.

In a further addition to this first embodiment, IUIs for any number of such encrypted files may be assembled into a descriptor file. In one specific implementation, the descriptor file includes meta data for each file (such as the file name), the IUI of the plaintext file and the IUI of the encrypted file. An algorithm is applied to the descriptor file to produce an IUI for the descriptor file. The plaintext descriptor file is then encrypted using the descriptor file IUI as a key for the encryption algorithm. The result produces an encrypted descriptor file. An algorithm is then applied to the encrypted descriptor file to produce an IUI for the encrypted descriptor file. The encrypted files and the encrypted descriptor file may then be safely stored or transferred within a network. The IUI of the encrypted descriptor file is used as a location-independent identifier to locate the encrypted descriptor file.

Thus, an interested party is able to locate and retrieve the encrypted descriptor file using its IUI. The party would not, however, be able to decrypt the encrypted descriptor file unless it is also provided with the IUI of the descriptor file which has been used as an encryption key. Thus, this key may be withheld from a party until such a party is authorized to gain access to information included within the files. Once the party obtains the IUI of the descriptor file, it may then decrypt the encrypted descriptor file to obtain the plaintext descriptor file. Using the IUIs of the encrypted and plaintext files included in the descriptor file, the party may then locate the encrypted data files and decrypt them. In an alternate implementation, the IUIs of the encrypted data files may be located outside of the descriptor file and may be provided to the interested party so that the party may retrieve the encrypted data files. In this scenario, the IUIs of the encrypted data files may or may not be present within the descriptor file.

In a second embodiment of the invention a flattened descriptor file may also be produced. A descriptor file, its IUI, an encrypted descriptor file and its IUI may be produced as described in the first embodiment. Additionally, a flattened descriptor file is created based upon the descriptor file. The flattened descriptor file includes the IUIs of the encrypted data files and the IUI of the encrypted descriptor file. An algorithm is then applied to the flattened descriptor file to produce its own IUI. The IUI of the flattened descriptor file may then be used as a unique identifier to indirectly reference all of the data files listed within the descriptor file. Using the IUI of the flattened descriptor file, an interested party may retrieve the flattened descriptor file (in plaintext). Using the IUIs it contains the party may then obtain not only the encrypted data files but also the encrypted descriptor file.

At this point, however, even though the party has the encrypted data files, it does not have access to these files. At a suitable time, the party may then be supplied with the IUI of the descriptor file which serves as a key to decrypt the encrypted descriptor file. Once decrypted, the party may then use the descriptor file as described in the first embodiment to retrieve and decrypt the data files. Advantageously, two items are necessary for retrieval and decryption of the data files: the IUI of the flattened descriptor file which allows retrieval of the encrypted data files; and the IUI of the plaintext descriptor file which allows decryption of the encrypted descriptor file. Thus, one or both may be withheld from a party to prevent its access to the data files, while allowing the party to physically obtain the encrypted files. Furthermore, a party able to retrieve the encrypted data files is guaranteed that the files have not been changed from the time their IUIs have been calculated, but is unable to decrypt these files unless it receives the second item.

Through use of the present invention, each file to be stored or transferred need only be encrypted once using one key, and only the encrypted version of the file need be manipulated. There is no need to use different keys for different users. Further, should the same file exist in two different locations on a computer or within a network, use of the present invention produces an encrypted file for each that is the same automatically. Thus, only this single encrypted file need be stored and/or transferred. Such benefits accrue automatically due to the nature of the present invention. The encrypted form of each file can be stored or transmitted anywhere within a computer network without the need for firewalls, access control, virtual private networks, or secure session protocols. Further, by using the intrinsic unique identifier to serve as the encryption key for the file as well, this single identifier not only serves to authenticate the file but also to verify the integrity of the file.

The present invention in its many embodiments provides a variety of advantages in numerous applications which will be discussed below.

BRIEF DESCRIPTION OF THE DRAWINGS

The invention, together with further advantages thereof, may best be understood by reference to the following description taken in conjunction with the accompanying drawings in which:

FIG. 6A illustrates an example of an implementation of a descriptor file written using a modified version of XML.

FIG. 6B illustrates a modified or "flattened" descriptor file suitable for use in the second embodiment.

DETAILED DESCRIPTION OF THE INVENTION

Figure 1:
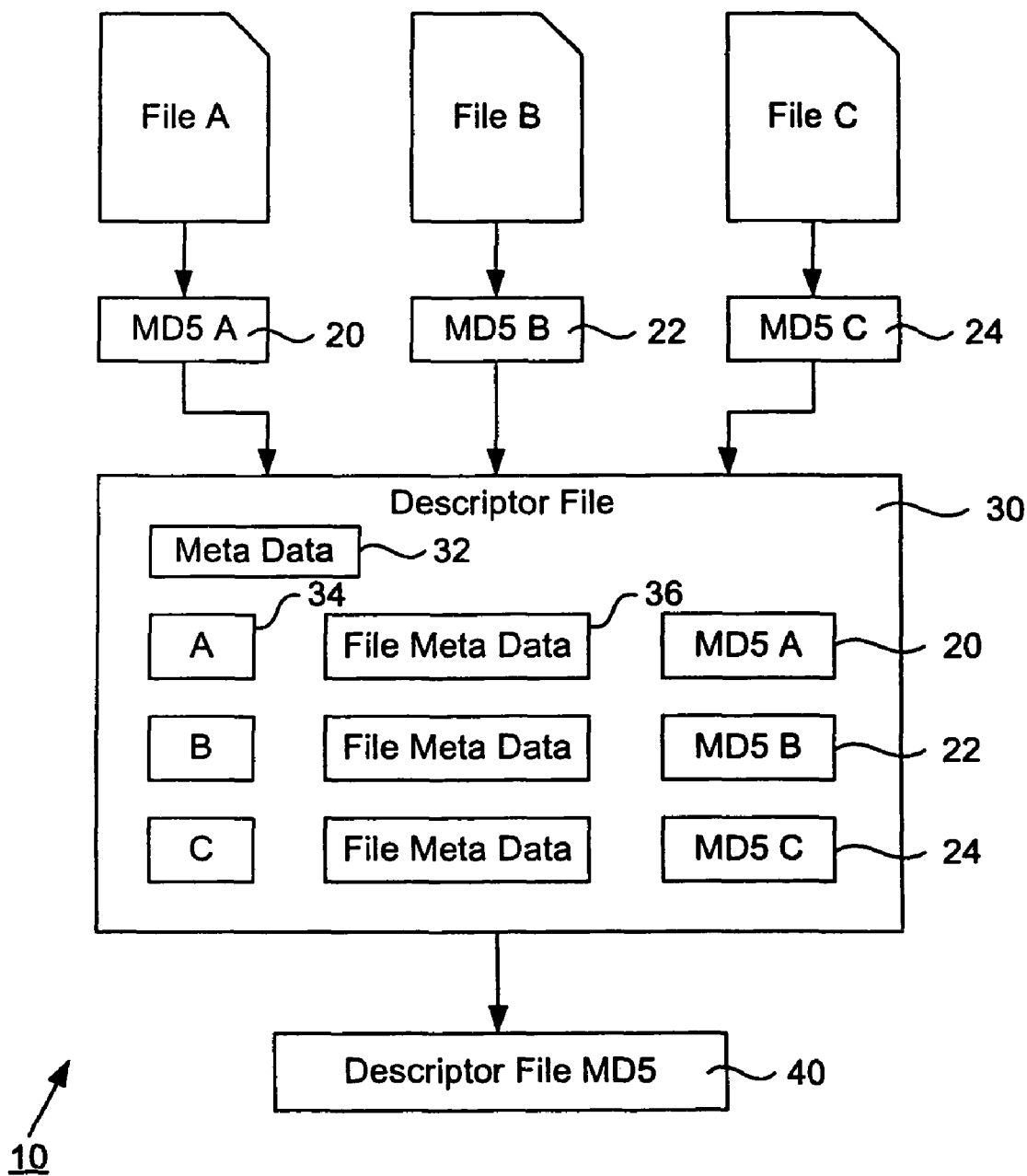
FIG. 1 illustrates a prior art technique by which any number of files are uniquely represented by an identifier for later retrieval.

The present invention is applicable to a wide variety of digital information. As used herein, digital information may refer to a computer file, a group of files, a group of file identifiers, or other collections of data or database information. Such other collections of data include documents, selected frames or clips from digital audio or video streams, streams from message records or files, of log entries from audits or status logs of systems. Database information might include selected database records from a relational, hierarchic, network or other format database. Indeed, digital information may include any string of binary digits used wholly or in part by some application or device. In one embodiment, the present invention manipulates digital information as binary large objects, or BLOBs (a bit sequence).

The following discussion illustrates embodiments of the invention using the example of typical computer files for ease of understanding. It should be pointed out, however, that embodiments of the invention are well-suited for use with any of the before mentioned digital information.

As discussed above, it would be desirable to address security issues relating to computer files and to the intrinsic unique identifiers (IUIs) of the data files and of a descriptor file. As pointed out, it is possible for a data file to be obtained by unauthorized parties or for an IUI of a descriptor file to be intercepted. Although it may appear that standard encryption techniques may address these problems, there are drawbacks associated with conventional uses of these standard techniques.

For example, it can prove burdensome to store or send a file to numerous people using public key cryptography. In order to send a single file to fifty people using public key cryptography, one would first have to obtain the public key from each of the fifty people. Then, fifty copies of the file would have to be made, and each file encrypted with a different one of the fifty keys. Fifty different encrypted files would then be created which are sent out or stored for later retrieval. The problem is that the single file that was started with has now become fifty different files each of which must be managed and transported separately. Calculation of an identifier for each of the fifty encrypted files would then produce fifty different identifiers each of which must be managed and transported. It would be most desirable to have a single copy of the plaintext file and a single copy of the encrypted file for use by an authorized entity to cut down on the proliferation of files copies.

Use of conventional symmetric cryptography also has drawbacks. Using the above example of a single file to be distributed to fifty people, one might choose to use a different random key to encrypt the file fifty times. Again, fifty different encrypted files must be generated and each of the random keys must also somehow be transmitted to each person. Further, consider the situation in which fifty different files are to be sent to one person. If only a single key is used to encrypt all of the files, then it would become much easier to hack the key and determine its value by an unscrupulous third party. Further, if each file is encrypted with a different key, then each of these keys must somehow be transmitted to the person and managed in a secure fashion.

Finally, a typical prior art use of either asymmetric or symmetric cryptography to encrypt a file might provide a file that is encrypted, but the keys used do not provide assurance that the file has not somehow been tampered with in either its plaintext or encrypted form. Also, a file that has been tampered with might not be able to be decrypted. It would be most desirable if a single key could be used to not only encrypt a file but to also insure the integrity of its contents. Further, it would be desirable to store and/or transmit the key or keys for a given set of files in a secure manner. Accordingly, the present invention realizes a technique for addressing the above issues.

First Embodiment

Figure 2:
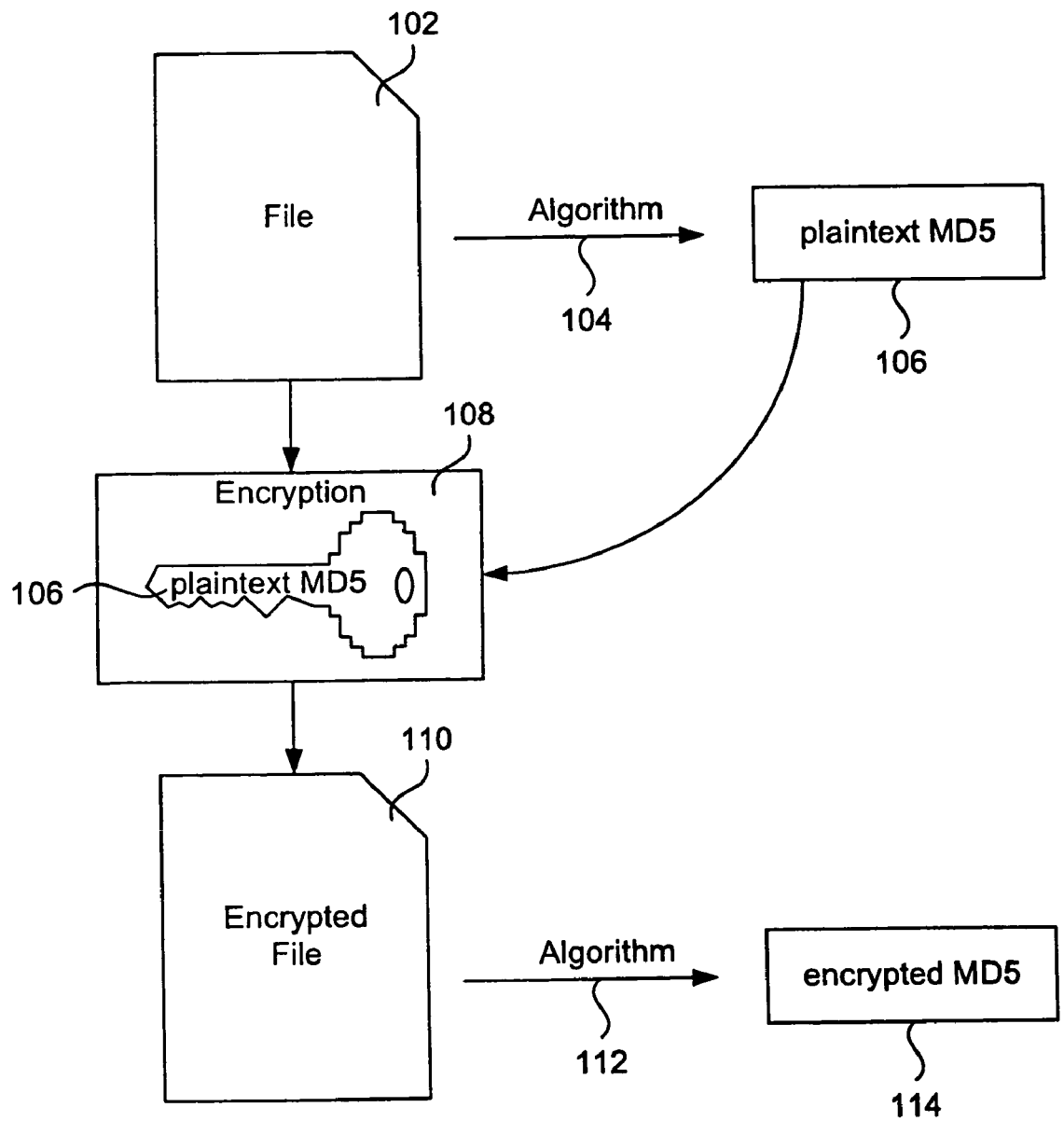
FIG. 2 illustrates a technique by which a file may be encrypted according to one embodiment of the invention.

FIG. 2 illustrates a technique by which a file may be encrypted according to one embodiment of the invention.

Figure 3:
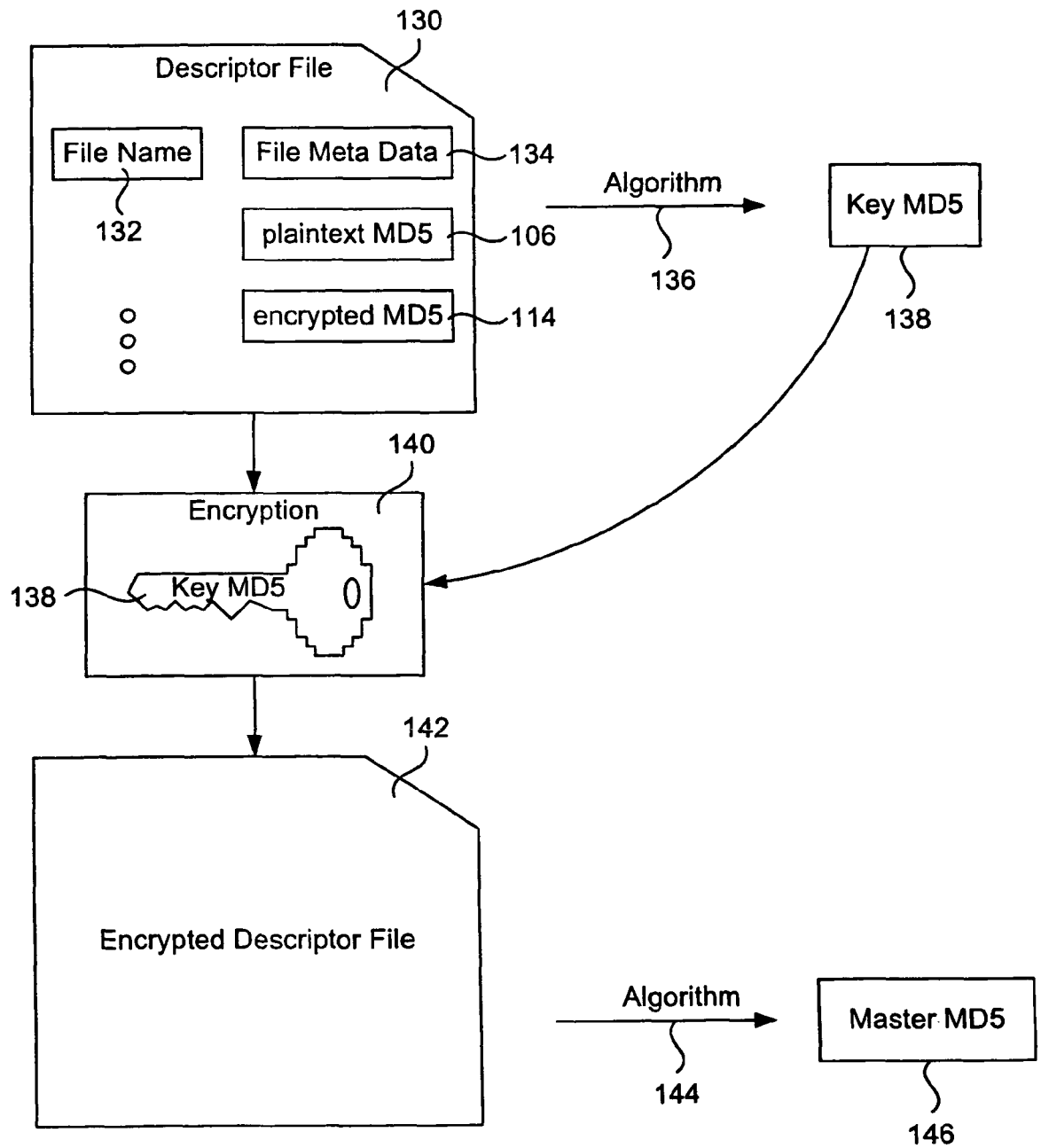
FIG. 3 illustrates a technique by which a descriptor file is created and encrypted according to one embodiment of the invention.
Figure 4:
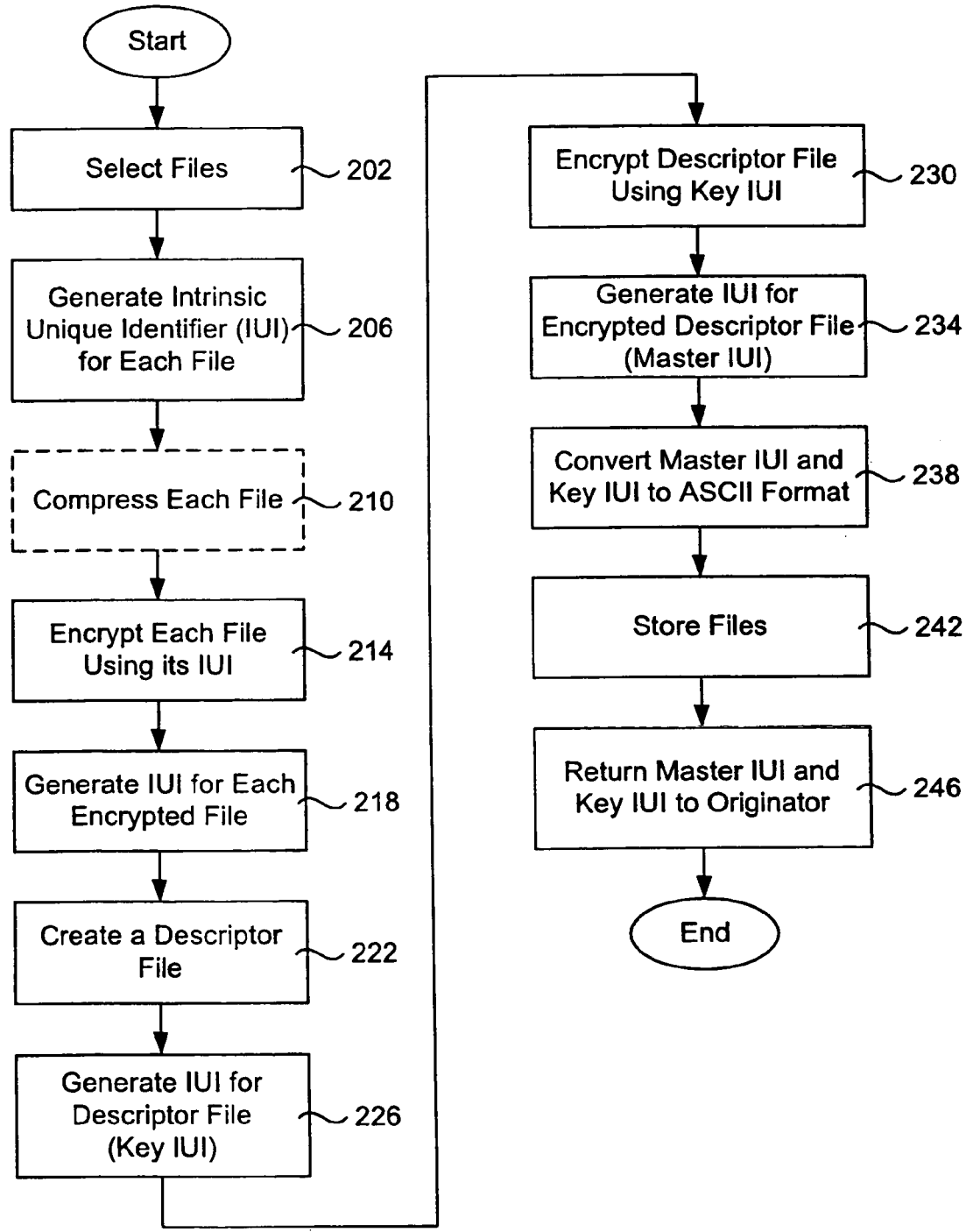
FIG. 4 is a flow diagram describing how an intrinsic unique identifier (IUI) may be created for a group of files.

FIG. 3 illustrates a technique by which a descriptor file is created and encrypted according to one embodiment of the invention. FIG. 4 is a flow diagram describing how an intrinsic unique identifier (IUI) may be created for a group of files. FIG. 4 will be explained with reference to FIGS. 2 and 3. In step 202 a group of files (or one file) is selected and its corresponding file data and any meta data is collected. As mentioned above, the files selected may be computer files or any of the digital information previously described. The files selected may include a descriptor file, any type of encrypted or compressed file or files that themselves contain intrinsic unique identifiers. File 102 is an example of one of the files selected and will be used to illustrate this embodiment. Other selected files or information are preferably treated in a similar fashion as file 102.

In step 206 an intrinsic unique identifier (IUI) is generated for each file. Algorithm 104 is applied to file 102 to produce IUI 106. The algorithm may be applied to the complete file or to any portion of the file. Algorithm 104 is preferably any algorithm that can generate a reliably unique identifier for the file based upon the file contents. As such, the IUI generated is repeatable in that application of the algorithm again to the file will produce the same IUI. The term "intrinsic" is used to indicate that the IUI is based at least in part (or in whole) upon the contents of the file. Algorithm 104 may be any of a wide variety of algorithms. By way of example, algorithm 104 may be a hash function such as the MD5 algorithm or SHA-1 that produce a message digest, or may be an error detection algorithm such as employed in cyclic redundancy checking (CRC).

Preferably, an algorithm should consistently produce the same binary number for any specific instance of digital information and such a binary number should be practically proven to be unique with a reasonably high probability for the class of digital information being identified. Use of such an algorithm over two binary sequences that result in the same binary number can prove that the two binary sequences are the same. Conversely, use of the algorithm over two binary sequences that result in different binary numbers can prove that the binary sequences are different. Such an algorithm simplifies the identification of copies of a particular portion of digital information (such as a computer file). The result of such an algorithm is referred to herein as an intrinsic unique identifier (IUI). Other algorithms may be used to generate an intrinsic unique identifier as long as the probability of generating identical identifiers from different files is below a threshold that is defined as acceptable.

In a preferred embodiment of the invention, the algorithm used is the MD5 algorithm and produces a 128-bit message digest referred to herein as simply the "MD5." In this case, algorithm 104 generates plaintext MD5 106. Plaintext MD5 106 is an intrinsic unique identifier for file 102 and uniquely identifies file 102 based upon it contents. Should file 102 be changed a newly calculated MD5 would not match the MD5 calculated for the previous version of the file.

In step 210 an optional compression step may be performed. In a preferred embodiment, each file is also compressed. Any of a wide variety of compression algorithms may be used; the LZW algorithm is preferable, although other algorithms associated with formats such as GZIP and CAB may be used. Compression may also be performed after encryption although it is preferable to perform compression first, or to perform both together. Alternatively, it is possible to perform the compression step and not the encryption step.

In step 214 each file is encrypted using its recently generated MD5 as the key for the encryption algorithm. For example, file 102 is encrypted using encryption algorithm 108 with the key being plaintext MD5 106 to produce an encrypted file 110. Any of a wide variety of ciphers may be used as the encryption algorithm. By way of example, the "Two Fish" algorithm works well, although other algorithms such as block and stream cipher may also be used.

The use of plaintext MD5 106 to encrypt file 102 provides advantages. The single key used to encrypt and decrypt file 102 can also be used to verify the integrity of the file because the key happens to be plaintext MD5 106 that has been generated using the MD5 algorithm. Because it is an intrinsic unique identifier it may also be used to verify that the contents of file 102 have not changed.

Now that encrypted file 110 has been created it may be stored and/or transferred within a computer network in a secure manner. In step 218 an intrinsic unique identifier is generated for file 110 using algorithm 112. In this example, algorithm 112 is the MD5 algorithm and the result is encrypted MD5 114. Preferably, algorithm 112 is the same as algorithm 104. It is possible, however, that the two algorithms may be different; for example, by convention it may be agreed that plaintext files use a particular algorithm while encrypted files use a different algorithm to generate their intrinsic unique identifiers.

At this point, a secure and sufficient technique for storing, locating and retrieving file 102 has been described. Encrypted file 110 may now be stored within a computer network instead of storing the plaintext file 102. By providing a user with encrypted MD5 114, the user will be able to locate and retrieve file 110. The integrity of file 110 can be guaranteed by recalculating the MD5 of the file and comparing it to MD5 114. The key 106 to encryption algorithm 108 may be held by the originating party and only released to a user when it is desired that the user has access to file 110. Once the key 106 is given to someone that has retrieved file 110, the file may be decrypted to produce plaintext file 102. Thus, two pieces of information are necessary for a user to have access to file 102: encrypted MD5 114 and plaintext MD5 106. A user that is provided with encrypted file 110 is also guaranteed that the original plaintext file has not been changed.

Figure 5:
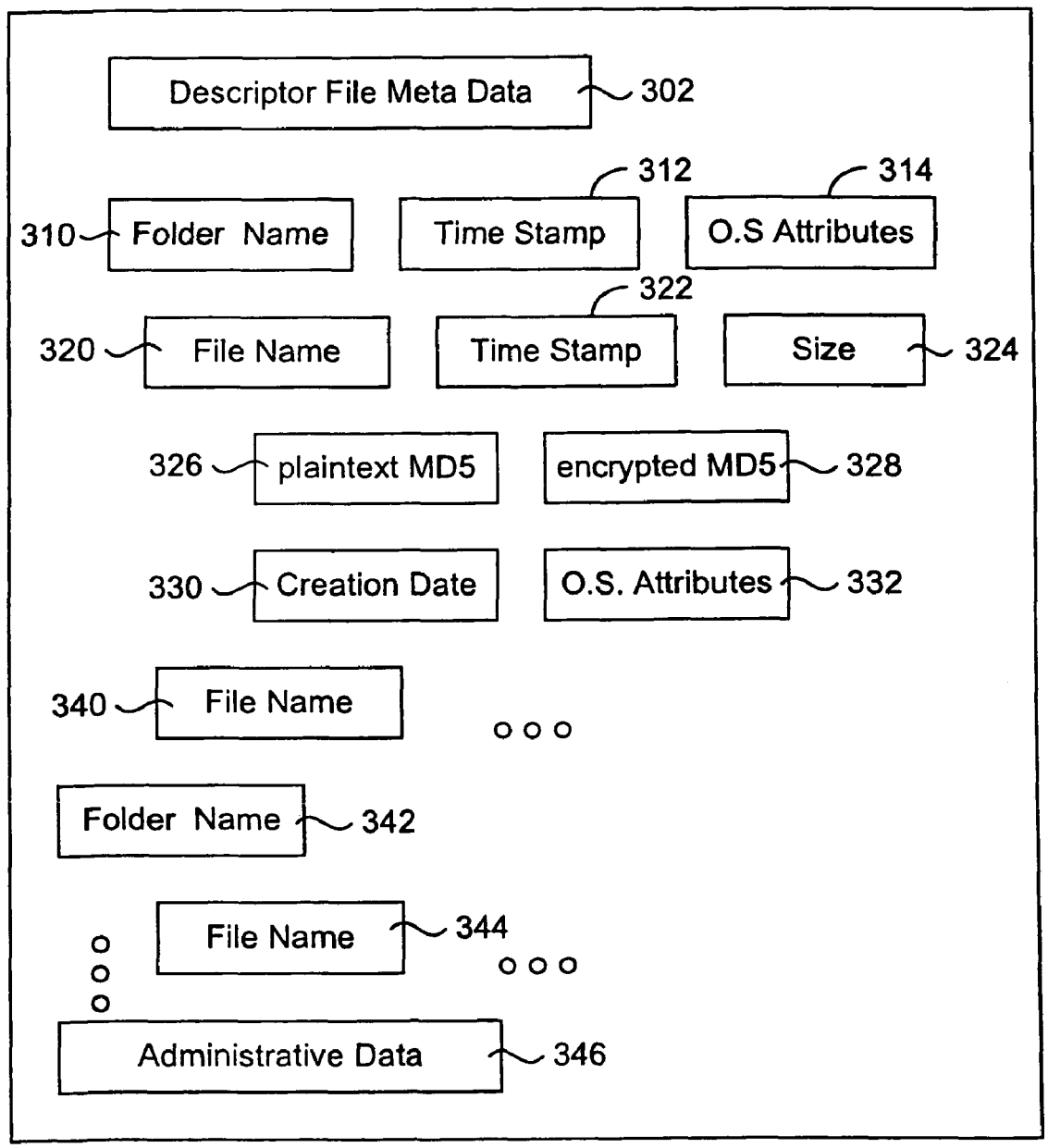
FIG. 5 illustrates symbolically one example of a descriptor file.

In step 222 a descriptor file is created that represents all of the files that have been selected. FIGS. 5 and 6 provide greater detail of how a descriptor file may appear. Descriptor file 130 may include a variety of information and may take many forms. In this example, for each of these files selected and previously encrypted, it includes a file name 132, file meta data 134, plaintext MD5 106 and encrypted MD5 114. In other embodiments the encrypted MD5 for each file may also be located elsewhere to assist in locating the encrypted files and may or may not also appear in file 130. A descriptor file 130 includes the plaintext MD5 for each file, once descriptor file 130 has been obtained it may be used to decode the encrypted files to obtain the original plaintext files.

In step 226 an intrinsic unique identifier is generated for descriptor file 130. In a preferred embodiment, algorithm 136 is the MD5 algorithm which is used to create MD5 138 which is preferred to as the "key MD5." In step 230 descriptor file 130 is encrypted using key MD5 138 as the key to encryption algorithm 140 to produce encrypted descriptor file 142. Preferably encryption algorithm 140 is the Two Fish algorithm. File 130 may also be compressed in a similar way as discussed in step 210. MD5 138 is referred to as the "key MD5" because it provides the key for decrypting file 142.

In step 234 an intrinsic unique identifier for file 142 is generated using algorithm 144. Preferably, the MD5 algorithm is used to produce master MD5 146. Preferably, algorithms 136 and 144 are the same algorithms although they may be different, and may be different from algorithms 104 and 112. By convention, it may be agreed upon beforehand to use different algorithms in different places. Also, meta data 134 may also indicate which algorithms are to be used with the plaintext and encrypted files. By the same token, meta data for file 130 may be included therewithin to indicate algorithm 136. At this point, the selected files have been uniquely identified using either master MD5 146 or key MD5 138.

Step 238 is an optional step in which the master MD5 and the key MD5 are encoded. Because a resultant MD5 is a 128-bit number, it may be desirable to encode this number in a more manageable form for human use. The resultant number may be encoded in any of a variety of forms including decimal, hexadecimal or binary. Preferably, the number is converted to a base 36 number mapped to the set of twenty-six alphabetic and numeric characters in the base ASCII character set. This mapping is referred to as "ASCII Armoring" and is commonly used to render binary information in a limited character set for transmission over protocols that require content to be constrained to alphanumeric coding. In a preferred embodiment, a flag character is included at a predetermined position within the resulting string bringing the total length of the string to 27 characters. This flag character could also provide information such as algorithm to use, type of file, etc.

The result is a 27-character ASCII string of digits and upper case letters. Such a format provides a compact form that may more easily be written down by a person and/or manipulated by a computer, and is also in a form that is easily accommodated by many software programs. In addition, this particular representation of an intrinsic unique identifier has the advantage of being more easily retrieved by data query, coded into software application file requests, referenced by a content or asset management system, requested in an object browser, electronically copied and pasted from one document to another, sent via electronic mail, etc.

Master MD5 146 may also be associated with a file locator to assist with finding file 142. Although the invention works without an additional file locator, one may be used. An example of a file locator is a URL, an IP address, or a path name.

In step 242 the encrypted files that have been created may be stored. The files created may be stored in any suitable location such as on the user's computer, at a remote server, in an archive, at the site of a future user, or other. In fact, the files created need not be stored together, but may be stored in different locations. Preferably, the files that are stored for future reference by a user include the encrypted files (such as file 110) and the encrypted descriptor file 142. Preferable, the plaintext files (such as file 102) and the plaintext descriptor file 130 need not be stored in an accessible location due to security. The files may be destroyed or kept by the originator in a secure location. Because the plaintext files can be created from the encrypted files using the appropriate key, it is not necessary to have the plaintext files easily available.

In step 246 the master MD5 146 and the key MD5 138 are returned to the originator for future reference. At this point, both the master MD5 and the key MD5 would be needed by a party who wishes to access the encrypted files. For example, should the originator wish an interested party to have access to the encrypted files at some point, he may provide that party with the master MD5. Using master MD5 that party could obtain encrypted descriptor file 142 but would have no way of decrypting it. Only when the party is provided with key MD5 from the originator, can that party decrypt file 142 and obtain not only the encrypted MD5s (to locate each encrypted file) but also the plaintext MD5 for each file (which would allow that party to decrypt the encrypted file and verify that the original file has not changed). Alternatively, an interested party may be provided with the encrypted MD5s in addition to the master MD5 which would allow that party to retrieve the encrypted files but not decrypt them. Once the key MD5 was provided, the party could decrypt the descriptor file, obtain the keys for the data files, and decrypt them. In an alternative embodiment, the user may be supplied with MD5s for the encrypted data files but is not supplied with the master MD5 or the key MD5 until a later time. Alternatively, the user may be supplied with the key MD5 initially and the master MD5 later. Such embodiments have a variety of applications which are discussed below.

Descriptor File Examples

FIG. 5 illustrates symbolically one example of a descriptor file 300. In general, a descriptor file includes the plaintext MD5 for each of the encrypted data files. Thus, once the descriptor file is obtained and decrypted, the user may then decrypt the encrypted data files using the plaintext MD5 for each file as a key in the decryption algorithm. Other information may optionally be included within the descriptor file to assist with locating an encrypted data file, reconstructing its directory environment, and/or administrating a scheme for generating revenue for the use of such a technique. Further, a descriptor file may be implemented in any of a wide variety of modeling languages; examples are given in FIG. 6A.

In one specific embodiment, descriptor file 300 includes meta data 302 that describes options regarding the descriptor file and information concerning its use and contents. By way of example, meta data 302 includes the type of the descriptor file, a name for the descriptor file, a creation date, comments, the number of data files that it represents, the number of directory folders it represents, the total size of all of the files combined that it represents and other information such as author, keywords, etc.

A user-supplied name may be assigned when the descriptor file is created and is used as a mnemonic aid by the user to identify a folder (for example) from which files represented by the descriptor file have originated. In another embodiment of the invention, the name of the folder itself is suggested automatically as a mnemonic aid. This name can be associated with the master MD5 created for the descriptor file to enable a user to more easily identify the general contents of a descriptor file. For example, when retrieving data using a particular master MD5 this name may be included to assist the user. The creation date indicates when the descriptor file was created and is useful for keeping track of versions. Comments may be inserted into the descriptor file for any purpose by the user. The number of files represented, number of folders and total size is useful for progress status during downloading.

A descriptor file may include any number of represented files and optionally may include the folders in which the files originally resided. Any number of folders and any hierarchy may be represented in the descriptor file. By way of example, included is a folder name 310, its time stamp 312 and operating system attributes 314. Time stamp 312 indicates when the folder was last modified. Attributes 314 indicate operating specific attributes for the folder such as whether the folder is read-only, whether it should be hidden, and its type such as system, archive or temporary.

Any number of files may be indicated as being originally found within folder 310, such as the files identified by file name 320 and file name 340. A wide variety of meta data may be present that provides information regarding the file identified by file name 320. Included is a time stamp 322 indicating when the file was last changed, a size 324, the plaintext MD5 326, the encrypted MD5 328, a creation date of the file 330, and any number of operating specific attributes 322. These attributes may include the read or write status of the file, the file type, its creator, etc. By including the encrypted MD5 328 for the file, the file becomes content addressable using the encrypted MD5 as a location-independent file name. Plaintext MD5 326 can then be used to decrypt the retrieved encrypted file. Other file names and associated meta data may also be indicated as being included in folder 310. Any number of folders and their included files (indicated by 324 and 344) may also be included. A hierarchy of folders may exist in which one folder and its files are present within another folder.

Administrative data 346 may also be included within the descriptor file 300 to assist in generating revenue from use of the technique, tracking the software which embodies the technique, etc. By way of example, data 346 includes an identifier indicating on which machine the software was originally installed. In one embodiment of the invention, software which embodies the invention is either sold, licensed, or provided free to users. Included along with the software is a so-called "token box" that represents the number of times that a user may create a descriptor file and generate a master MD5 for a collection of files. Included within data 346 would then be a token box identifier and a token box count. The box identifier uniquely identifies the particular box that was provided along with software to a user. The box count indicates the number of times that a user may generate a descriptor file and its corresponding master MD5. For example, a user may pay for (or receive free) software embodying the invention that has a box count of 1000. The software keeps track of this box count variable and decrements it each time the user creates an encrypted descriptor file and its associated master MD5. The box identifier and the current box count are then included within data 346. The box identifier may by useful to indicate that only certain types of descriptor files may be generated. Preferable, it is unique for a given copy of software provided to a customer and is similar to a serial number. The box count included within the descriptor file is useful for tracking token boxes that have been "hacked" into to circumvent paying.

Also included within data 346 may be a digest of the complete descriptor file. For example, the digest may be created by performing a hash function upon the descriptor file and then encrypting the hash produced with a secret key known only to the manufacturer of the software. Asymmetric or symmetric cryptography may be used. By including this digest within (or at the end) of the descriptor file, the manufacturer of the software can prove whether or not the descriptor file and/or its associated master MD5 was created by the manufacturer because only the manufacturer can calculate this unique digest. Thus, the manufacturer can determine if another entity created the descriptor file and/or its master MD5. This information may be useful in determining whether to process a request for a retrieval of files, for requesting payment from an entity, or for legal protection of a particular implementation.

The type of a descriptor file indicates one of a variety of types of the file and its associated master MD5. In general, a particular type provides different meta data and different behavior for different classes of descriptor files. For example, certain types of descriptor files may include certain meta data that are not present within other types and may cause a software agent or an operating system to initiate various actions that are different from other types. A wide variety of types may be defined for descriptor files. By way of example, these types include the following. A standard type may automatically place retrieved files back into a default folder on the desk top of the user's computer when the files are retrieved using embodiments of the present invention. In other scenarios, however, it may be desirable to retrieve a file and place it in a particular location within a computer or elsewhere. An extended type of descriptor file allows the descriptor file to include meta data for each file name or folder indicating to where within a computer and/or its operating system the file shall be placed when it is received. For example, for performing software replacement or upgrades, meta data included within the descriptor file for each file may indicate that a particular file should replace a file within the operating system of the computer. Thus, when the present invention is used to retrieve a file, a software agent may automatically place the retrieved file in the location indicated by the meta data.

Because automatic replacement or placement of operating system or application software files may be sensitive and require permission, a certificate may be included along with the descriptor file for this type. In this scenario a user of a descriptor file first approves of a given creator of the files that are to be retrieved. The software agent that implements the present invention then keeps track of a list of creators that are approved by the user. The user and the creator then agree upon a digital certificate that authenticates the creator to the user. Creation and use of digital certificates are well-known in the art and any of a variety may be used. In this situation, included within meta data 302 is a certificate from the creator that guarantees the authenticity of the files indicated within the descriptor file. Once the software agent has decrypted the descriptor file, it retrieves the certificate of the creator and verifies that it does in fact authenticate that particular creator. The software agent then compares that creator to the list of approved creators, and if there is a match, the indicated files in the descriptor file are retrieved, decrypted and installed on the user's computer where indicated.

Another type of descriptor file is a trial type. When using this type of descriptor file, an advertisement appears on the user screen whenever a descriptor file is created and a master MD5 generated. In return for viewing the advertisement, the box count for that particular user is not decremented. The data representing the advertisement may be stored within the software agent that embodies the present invention, or may also be included within the descriptor file.

Another type of descriptor file is a service type. This descriptor file includes meta data that identifies a software plug-in in any suitable fashion. By way of example, the plug-in may be identified using an intrinsic unique identifier (IUI) according to any embodiment of the present invention or may be identified by using a file name, location, etc. When files are retrieved by the software agent by using the descriptor file, the software plug-in is identified, located and automatically installed upon the user's computer. For example, the plug-in may be a Java file to load or XML configuration files.

Descriptor files may also be customized by a user. For example, a user may create a custom type of descriptor file that automatically adds particular meta data and behavior to the file when it is created. Custom descriptor files may also be created for each company to whom software embodying the present invention is to be provided. For example, any relevant information may automatically be added to the descriptor file when created or the user may be prompted to add information that is relevant to the type of descriptor file and its contents. Automatic behavior may be added to a custom descriptor file that performs certain actions when a descriptor file is used to retrieve files. For examples, codes within the descriptor files may automatically send electronic mail. Other actions that may occur include publication on web sites.

FIG. 6A illustrates an example of an implementation of a descriptor file written using an application of XML. The extensible mark up language (XML) is preferred although other mechanisms such as initialization (".ini" files) may be used. The particular descriptor file shown uses a so-called "hyperfile" modeling language (HFML) based on XML to describe the structure of the directories containing files as well as the files themselves. An HFML is described in the U.S. provisional patent application No. 60/072,316, filed Jan. 23, 1998. In general, it should be noted that implementation of the invention is not restricted to a descriptor file written in any particular syntax. The HFML in the preferred embodiment is used because it is readily parsed and can be used to generate a tree-structured directory of the files and keys.

The descriptor file of FIG. 6A includes two MD5s for each file. The MD5 termed "decoded.md5" corresponds to plaintext MD5 106 of FIG. 2 (for example), and represents an intrinsic unique identifier for a plaintext file. The MD5 termed simply "md5" corresponds to encrypted MD5 114 of FIG. 2, and represents an intrinsic unique identifier for the encrypted plaintext file. The descriptor file of FIG. 6A includes no administrative data, although it may.

FIG. 6B illustrates a modified or "flattened" descriptor file suitable for use in the second embodiment. In the second embodiment (described in FIGS. 7 and 8), descriptor file 402 may be implemented as in FIG. 6A, and flattened descriptor file 460 may be implemented as in FIG. 6B. Note that the file of FIG. 6B includes the MD5 of the encrypted descriptor file of FIG. 6A (termed the "keyfile md5"), and includes the MD5s for the encrypted plaintext files, but not the MD5s for the plaintext files. FIG. 6B also includes administrative data ("eclipcontents") such as a box identifier, a box count, a seat identifier, and a digest.

Second Embodiment

The first embodiment has described the technique by which a master MD5 and a key MD5 are provided to a user who wishes to locate and access a collection of encrypted files. Because the master MD5 only allows access to encrypted descriptor file 142, it would be difficult for a user to locate and retrieve the encrypted data files because the descriptor file is encrypted. It is not until the user is also provided with the key MD5 that the user is able to decrypt the descriptor file and obtain the MD5s, allowing it to locate the encrypted data files. In various situations it may be desirable to allow a user to not only obtain the encrypted descriptor file at first, but also to allow the user to locate and obtain the encrypted data files without allowing those files to be encrypted. For example, this is useful when administrating pool servers, load balancing, caching, mirroring, and in other applications such as escrowing.

Figure 7:
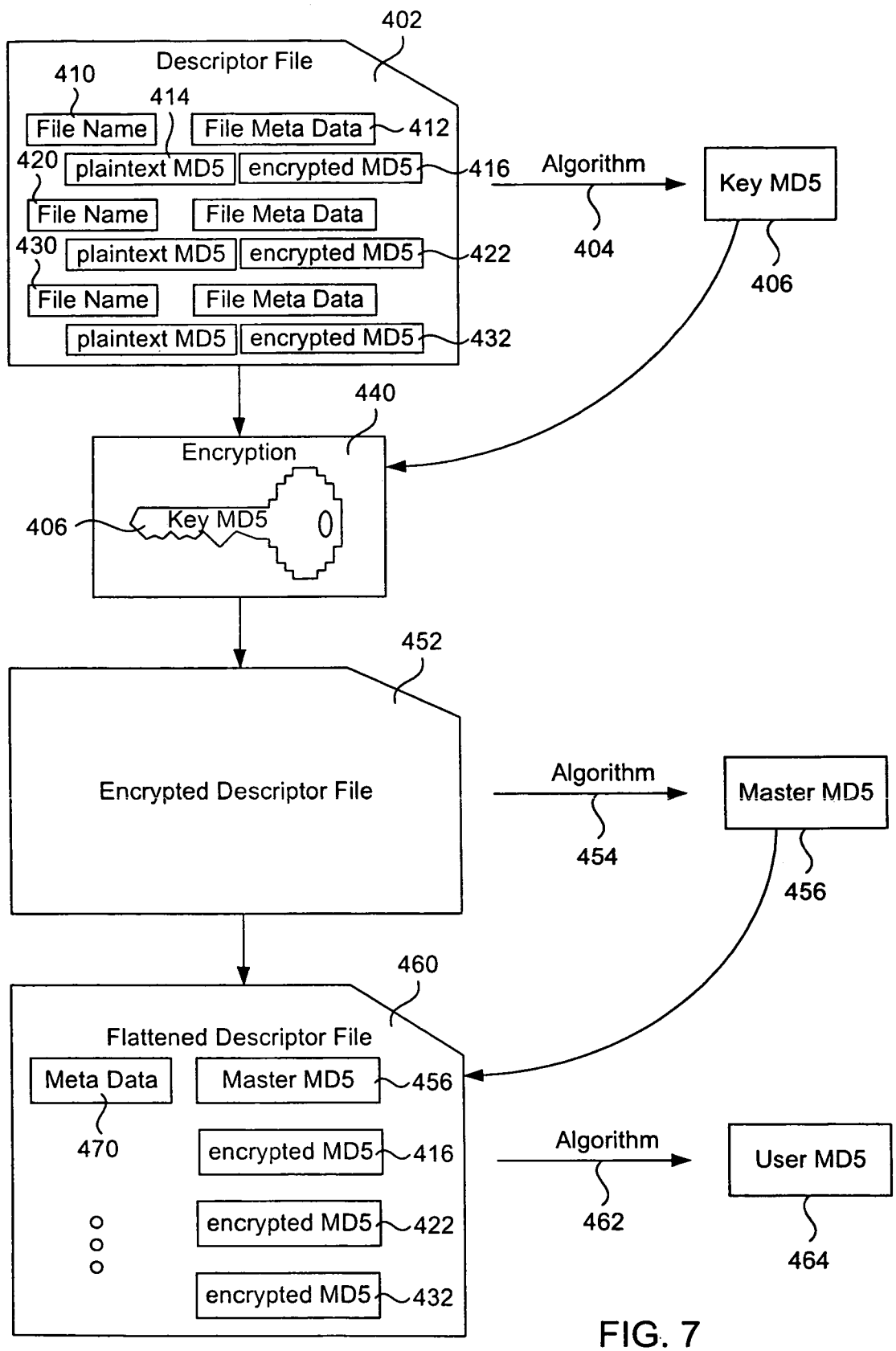
FIG. 7 illustrates a technique for generating intrinsic unique identifiers (IUIs) according to a second embodiment of the invention.
Figure 8:
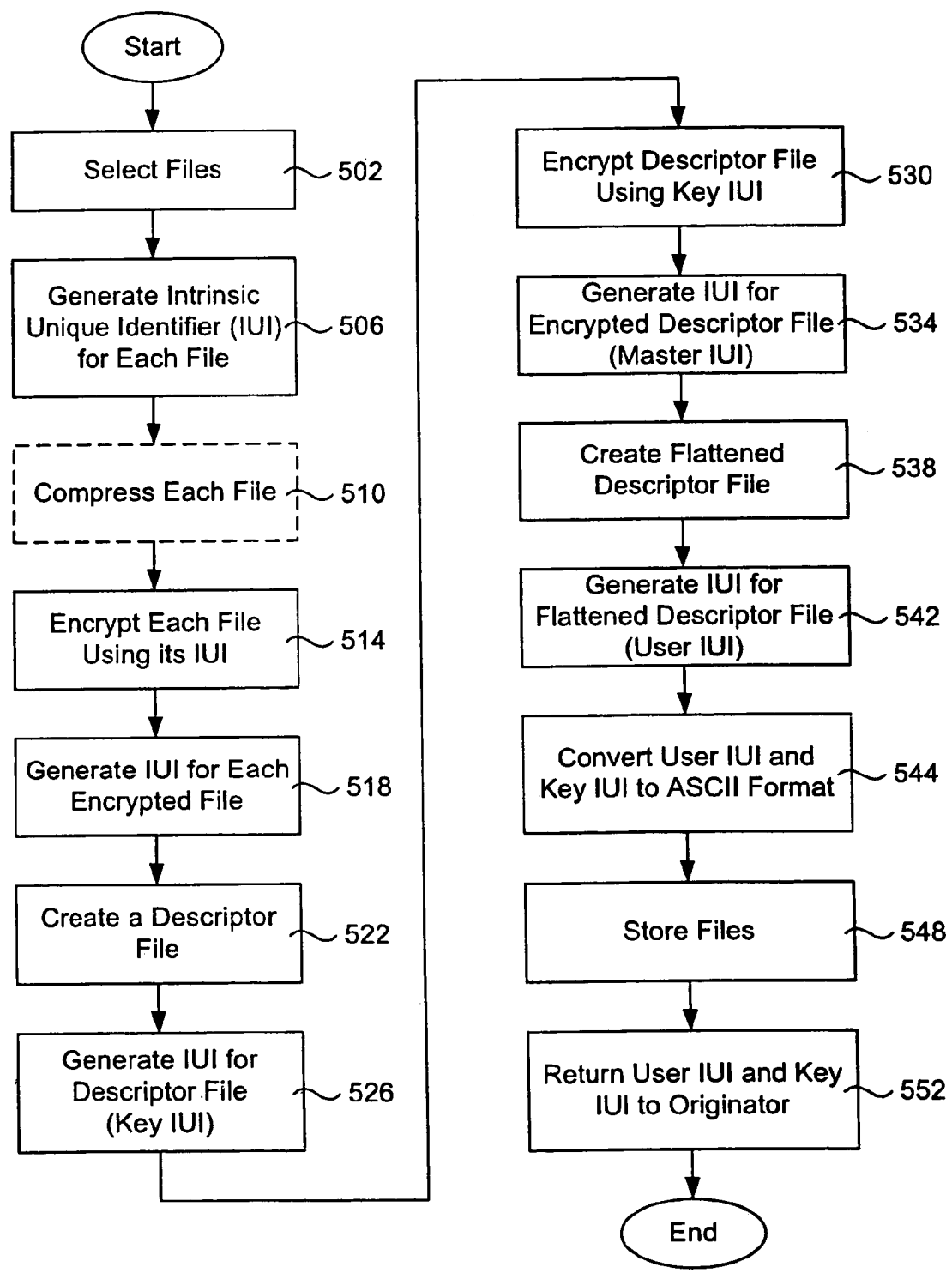
FIG. 8 is a flow diagram describing a technique for creating a number of intrinsic unique identifiers representing a collection of files according to a second embodiment of the invention.

FIGS. 7 and 8 describe an embodiment by which the user is not only allowed access to the encrypted descriptor file, but also obtains the means to locate the encrypted data files. FIG. 7 illustrates a technique for generating intrinsic unique identifiers (IUIs) according to a second embodiment of the invention. FIG. 8 is a flow diagram describing a technique for creating a number of intrinsic unique identifiers representing a collection of files according to a second embodiment of the invention.

In steps 502-518 a collection of files are selected, MD5s are generated and the files are encrypted in a similar fashion as described in steps 202-218 (not shown in FIG. 7). In step 522 descriptor file 402 is created. Descriptor file 402 includes representative meta data for any number of files and may also include other information such as is shown in FIGS. 5 and 6A. Included are a file name 410 representing a first file, its associated file meta data 412, its plaintext MD5 414 generated from the plaintext file and an encrypted MD5 416 that is generated from the encrypted file. File name 420 and file name 430 represent second and third files, respectively, and each have their associated meta data, plaintext MD5 and encrypted MD5.

In step 526 algorithm 404 is used to generate key MD5 406 for descriptor file 402. In step 530 descriptor file 402 is encrypted using key MD5 406 as the key to encryption algorithm 440 to produce encrypted descriptor file 452. MD5 406 is referred to as "key MD5" because it provides the key for decrypting file 452. In step 534 master MD5 456 for file 452 is generated using algorithm 454. Preferably, algorithms 404 and 454 are the same algorithms although they may be different, and may be different from algorithms used with the data files.

At this point master MD5 456 may be provided to a user to allow the user to locate and obtain encrypted descriptor file 452. The user, however, would be unable to locate the encrypted data files. It is conceivable that the originator may simply provide the encrypted data files to the user or may provide file locators for them or may even provide their encrypted MD5s in any fashion. In a preferred embodiment, however, the encrypted MD5s for the encrypted data files are provided in another modified descriptor file.

In step 538 flattened descriptor file 460 is created based in part upon the information in descriptor file 402. Included within the flattened descriptor file 406 are the encrypted MD5s 416, 422 and 432 that provide intrinsic unique identifiers to locate the encrypted files represented by file names 410, 420 and 430 in descriptor file 402. File 460 may be created by duplicating file 402, removing certain information and adding other information. For example, master MD5 456 is also added to file 460 to allow a user to access file 452. Meta data 470 associated with the file 460 may also be added. This meta data may be the same descriptor file meta data as found in file 402, may be a subset of that data, or may be different meta data or may not appear at all. For example, meta data 470 includes publicly searchable items but not private data.

The flattened descriptor file may take a wide variety of other forms. For example, other types of file locators may be included instead of the MD5s to provide access to the encrypted files or to the plaintext data files. Also, master MD5 456 is optional, and file meta data may also be included for each file.

In step 542 algorithm 462 is applied to file 460 to create a user MD5 464 that is an intrinsic unique identifier for file 460. Preferable, algorithm 462 is the MD5 algorithm. In step 544 the user MD5 464 and key MD5 406 are preferably converted to ASCII format in a similar fashion as described in step 238 to provide identifiers that are more manageable by a user. Because master MD5 456 is not handled directly by a user in this embodiment, it is optional whether to encode this identifier in file 460.

In step 548 the relevant files are stored for later access by a user. The files to be stored include the encrypted data files, encrypted descriptor file 452 and non-encrypted flattened descriptor file 460. These files may be stored in any suitable computing device or computer network and may be distributed in different locations. In one embodiment, the files are stored in what is termed a file "pool". In general, a file pool refers to a collection of distributed storage devices that store files only being identified by their MD5s (or other IUIs).

In step 552 the user MD5 464 and the key MD5 406 are returned to the originator for possible distribution to a requesting user. In this fashion, access to the encrypted data files and eventually to the plaintext files are provided simply via two identifiers, namely, user MD5 464 and key MD5 460. For example, using user MD5 464, the user can access and read file 460 which provides access to the encrypted data files and to the encrypted descriptor file (via the master MD5). Once the user is also supplied with key MD5 406, the user may decrypt the encrypted descriptor file, obtain the plaintext MD5s, and decrypt each of the encrypted data files.

File Retrieval Embodiments

At this point in time, the originator of the data files has generated key MD5 138 and master MD5 146 and has securely stored the encrypted files on a computer or on a distributed computer network. An interested party such as a user or software program may perform the following steps to retrieve the files.

In step 602 the user receives the master IUI (in this example master MD5) which is the identifier uniquely representing the files to be retrieved. In step 606 the user looks for the file identified by master MD5 146. The file may be searched for and obtained in a wide variety of ways. By way of example, the user looks for the file on a local computer or throughout a distributed computer network. Preferably, the file is initially identified by matching master MD5 146 with the MD5 of a particular file found. In a preferred embodiment of the invention, step 606 may be implemented as described in FIG. 11. In step 610 an encrypted descriptor file 142 that purports to correspond to master MD5 146 is received. Once received, the user may assume that the descriptor file is authentic by virtue of the search performed in step 606. It may be preferable, however, to verify that the received file is the correct file by first calculating the MD5 of the received encrypted descriptor file in step 614.

In step 618 the received file is verified as being authentic by comparing master MD5 146 with the MD5 just calculated from the received file. If the MD5s do not match, then control returns to step 606 to look for another file. If the MD5s match, then the file is authentic and the process may continue. Steps 614 and 618 are optional steps.

By virtue of possessing encrypted descriptor file 142, at this point the user is effectively guaranteed that all data files that have been encrypted and identified in the plaintext descriptor file are effectively sealed and have not changed. For example, should an unscrupulous party attempt to modify one of the data files, the MD5s of the plaintext file and of the encrypted file would not match with MD5 106 and 114 in the plaintext descriptor file. In this way, the holder of the encrypted descriptor file can be assured that once the descriptor file is decrypted that it will be able to verifiably identify the original data files that have been identified in the descriptor file. In this way, encrypted descriptor file 142 serves as a type of escrow of the original data files. As such, key MD5 138 may be delivered to the user concurrently with master MD5 146, sometime shortly there after, or at some later time when the originator wishes the user to have access to the original data files.

Therefore, at some appropriate time, in step 622 the user receives the key IUI (in this case key MD5 138) and may begin to obtain the original files. In step 626 the user uses key 138 to decrypt descriptor file 142 and obtain plaintext descriptor file 130. Although optional at this point, in step 630 the user may wish to verify that plaintext descriptor file 130 is also authentic. For example, the user may recalculate the MD5 for file 130 and compare it to key 138. Such a check verifies that a bogus descriptor file 130 has not been substituted for the correct descriptor file and then encrypted using key 138. Additionally, a digest may be recalculated for file 130 and compared to a previously calculated digest already present in file 130. For example, as pointed out in FIG. 5, administrative data 346 may include a unique digest that has been calculated by the true creator of descriptor file 130. If, for some reason the MD5s to not match or the digest is incorrect, the in step 634 an error handler is invoked to produce a suitable error message and a suitable action.

In step 638 the directory structure (if any) described in descriptor file 130 is rebuilt using the information contained in the descriptor file. For example, a directory structure such as is shown in FIG. 5 or 6A or some other structure may be built. A hierarchy of folders may be created, folder and directory attributes may be assigned and individual file attributes may be identified for assigning to particular files once these files are retrieved.

Because descriptor file 130 lists the encrypted MD5 114 of each file identified, the user may now look for each of the encrypted files using these MD5s. Step 642 may be performed in any suitable fashion, for example, may be performed as described in step 606 and in FIG. 11 by which a file is identified having a particular IUI.

In step 646 a file is received that purports to correspond to encrypted MD5 114. Although the user may assume that this retrieved file is authentic, it is preferable in step 650 that the retrieved file is verified. By recalculating the MD5 of encrypted file 110 (for example) this recalculated MD5 maybe compared to encrypted MD5 114 to verify that the file identified in descriptor file 130 is in fact the file that has just been retrieved. If the file is not verified then step 642 may be implemented again to find the correct file.

Assuming the file has been verified, in step 654 encrypted file 110 is decrypted using plaintext MD5 106 to obtain the original plaintext file 102. In this embodiment of the invention, plaintext MD5 106 is also present within descriptor file 130 along with encrypted MD5 114. In other alternative embodiments, it is conceivable that plaintext MD5 106 need not be present within file 130 but is delivered to the user in another suitable fashion. The user may now assume that file 102 is the original file that has been sealed earlier. In an alternative embodiment, the user may also verify the authenticity of file 102 by recalculating its MD5 and comparing this recalculated MD5 with plaintext MD5 106. Such a check verifies that an unscrupulous party has not substituted a bogus file for original file 102 and then encrypted the bogus file using the MD5 of the original file. If the file is not verified, then a suitable error handler 662 is invoked.

If verified, in step 666 a file request list is updated to indicate that file 102 has been accurately been obtained. If not all files identified in descriptor file 130 have been received, then control returns to step 646 to receive another file. If all files have been received, in step 674 an indication is provided to the user that all files identified in descriptor file 130 have been successfully retrieved. In this fashion, a user provided with master MD5 146 and key MD5 138 is provided the means to obtain the originally encrypted and identified files, and is guaranteed that the original files have not been altered since they were encrypted.

Figure 10:
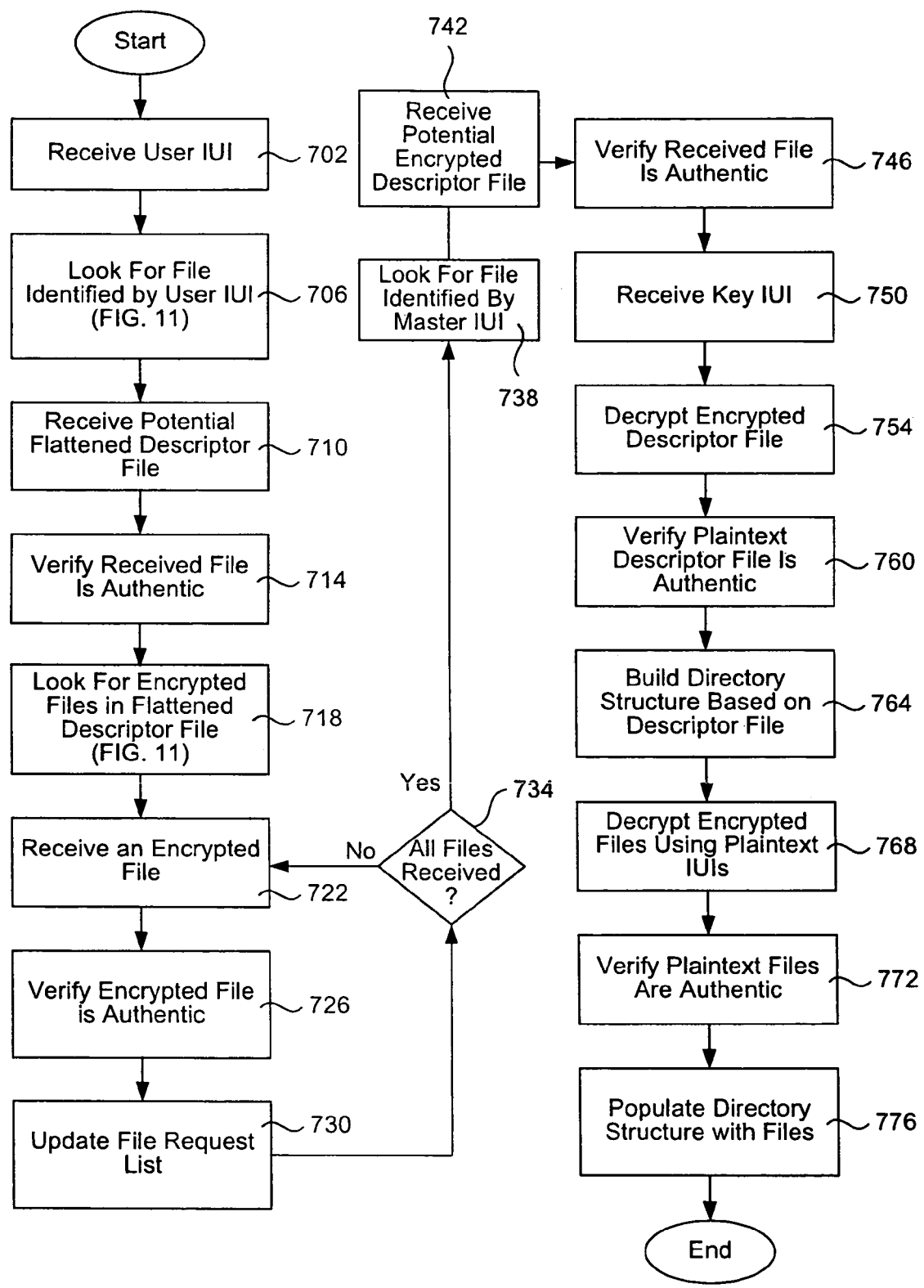
FIG. 10 is a flow diagram describing retrieval of files uniquely identified using the embodiment of FIG. 7.

FIG. 10 is a flow diagram describing retrieval of files uniquely identified using the embodiment of FIG. 7. Through the use of user MD5 464 and key MD5 406 a user may later locate and retrieve the plaintext versions of the files identified in descriptor file 402. Through the use of this embodiment a user is allowed to retrieve not only the encrypted descriptor file, but also the encrypted data files to retain in his possession. This may be advantageous in certain situations such as software escrow and pool management where a user wishes to keep in his possession the actual encrypted data files. The files cannot be decrypted, however, until key 406 is also supplied to the user.

Steps 702-710 may be performed in a similar fashion as in steps 602-610. In step 710, however, the file received is potentially the plaintext flattened descriptor file 460. In step 714 the user may further verify that the received flattened descriptor file is authentic by recalculating a digest for the file and comparing it to the digest included within administrative data 346 of file 460 (if present).

Now that the user has obtained the plaintext flattened descriptor file, in steps 718 and 722 the user may look for and retrieve those encrypted data files that are identified by their corresponding MD5s (for example 416, 422 and 432) included in file 460. These files may be identified and retrieved in any suitable manner and are preferably retrieved using the techniques described in steps 642, 646 and in FIG. 11.

In step 726 a received encrypted file is verified as being authentic by comparing its newly calculated MD5 with the MD5 from file 460 that has been used to retrieve it. If not authentic, control returns to step 722 to wait for another file. Once verified, in step 730 a file request list is updated to indicate that one of the encrypted data files has been successfully received. If, in step 734 not all files have been received, then control returns to step 722 to wait for another file.

In step 738 master MD5 456 is extracted from file 460. By using master MD5 456 present within flattened descriptor file 460, the user may now locate and retrieve encrypted descriptor file 452. Once the user is supplied with key MD5 406 from the originating party (once certain conditions are met, for example), the user will be able to eventually retrieve the original data files. For example, steps 738-764 may be performed as described in steps 606-638 above. Note that in step 750 the key MD5 is not supplied unless the originator wishes the user to have access to the original files.

Because the user has already retrieved the encrypted data files, once the directory structure has been built the user may decrypt the encrypted files in step 768 using the plaintext MD5s that are found in descriptor file 402. In an alternative embodiment, the plaintext MD5s need not be included the file 402, but may be supplied to the user in some other fashion. In step 772 the plaintext files may be verified as described in step 658. Finally, in step 776 the directory structure may be populated with the plaintext files to restore them to their proper place. Additionally, any file meta data included in descriptor file 402 may also be applied to each file.

Thus, through this embodiment a user to able to retrieve the encrypted descriptor file and all encrypted data files using user MD5 464. The user is unable to decrypt the data files until key MD5 406 is supplied.

Figure 11:
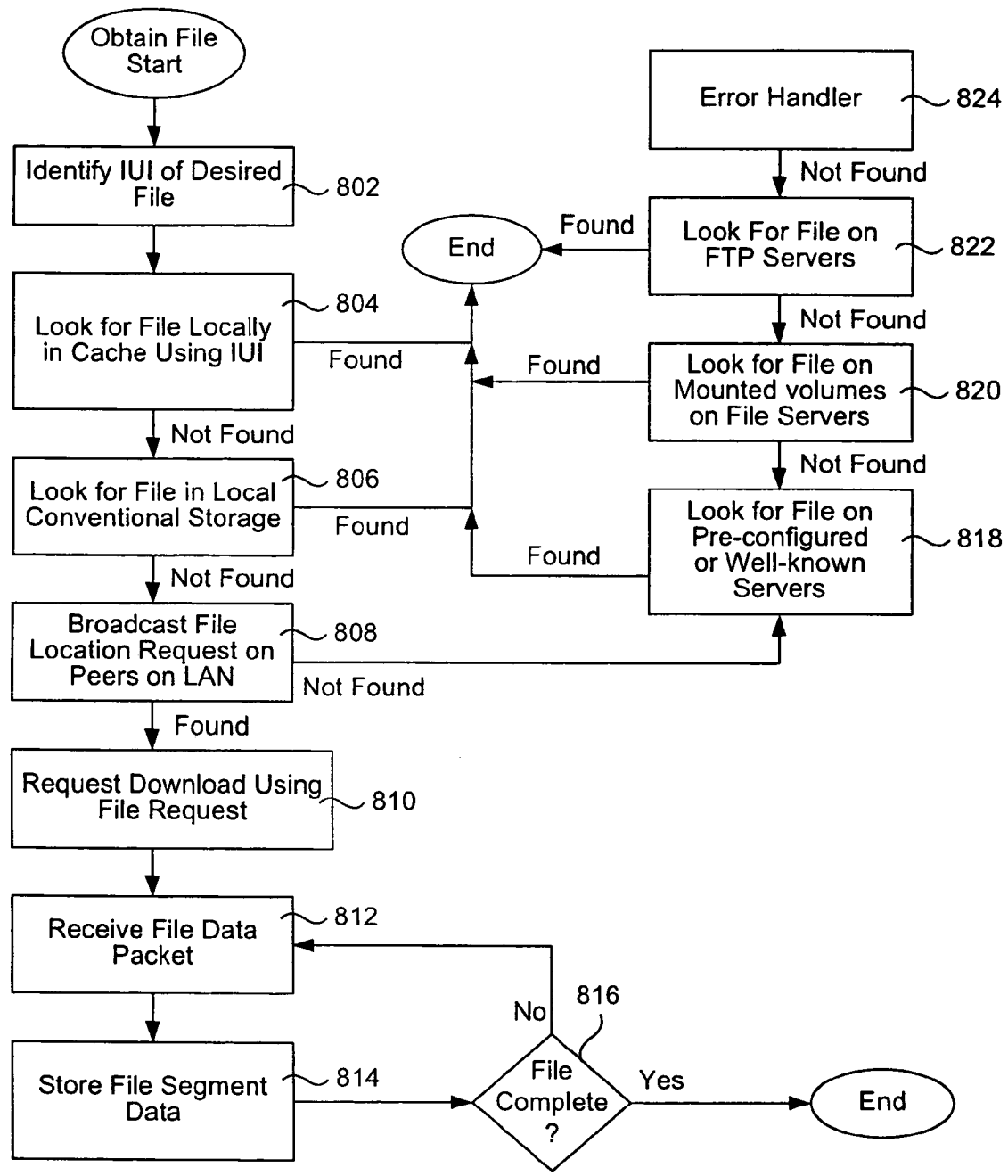
FIG. 11 is a flow diagram describing how a file may be looked for and obtained in accordance with an embodiment of the present invention.

FIG. 11 is a flow diagram describing how a file may be looked for and obtained in accordance with an embodiment of the present invention. The procedure of FIG. 11 may be used to implement steps 606, 642, 706, 718 and 738 of FIGS. 9 and 10 in a preferred embodiment of the invention.

In a preferred embodiment, a file (for example) is received in portions or segments. In other embodiments, files may be received whole or in a manner specified by any file transfer protocol. A file request list includes all of the files that are being requested until those files are received in their entirety. It is also possible that a file segment request list would be implemented that would include individual segments being requested. For example, individual segments of files may be requested when data or a code patch for a software application is required, or when specific entries for a database are obtained by a store or query result. An importer program manages the transfer of files to the recipient and determines when the files are.

In one embodiment, the importer has a specific hierarchy of locations in a computer system (or on a network) in which it looks for the files listed in a descriptor file. Thus, the importer may be implemented using a chained system which looks for files in different places. Thus, files are searched for first in the most convenient location and then in progressively less convenient locations. This "assembly line" is configurable in kind and quantity of importers and may automatically and dynamically change to optimize economy, security or performance. Because the MD5s serve as content-based file names that enable the content of files to be verified once the files are recovered, it is possible to allow files to be recovered from arbitrary locations where they may be found without regard to checking the contents of the file using some sort of check sum.

In step 802 the intrinsic unique identifier (IUI) of the file desired to be obtained is identified. This IUI may be any suitable identifier such as an MD5 that uniquely identifies a data file, a descriptor file, any encrypted file, or other digital information. In the following steps, the IUI may be matched with a particular file using any of a variety of techniques. In a preferred embodiment, files are stored along with their file name which is the IUI of the file. In other words, the encoded 27-bit alphanumeric MD5 of the file is also used as its file name. In this embodiment, the file system of a computer is used to help match the IUI with a particular file. In other embodiments, a database may use an IUI as a look up (or data base key) into the database to find the location of the file that is identified by the IUI. The database may contain a pointer to the file or the actual contents of the file if the file is a file object in an object-oriented database. Other techniques may be used to associate an IUI with a file in a storage device to facilitate matching a received IUI with a particular file on the storage device. For example, an IUI may also be associated with a file as a file attribute. It is also possible to recalculate an IUI for a found file and then compare it to an identified IUI to determine if the file is the correct file to retrieve. Other techniques include object database storage.

In step 804 an importer program looks for the desired file using its IUI in a local cache on the computer. In a preferred embodiment of the invention, this cache is a pool of files into which files have been stored previously, for example in steps 242 and 548. Advantageously, this pool of files stores the IUI of a file as its file name for efficient retrieval. The cache may be implemented on a local disk, within RAM, or on another local device. Preferably, the pool cache is organized as a hierarchy of folders wherein the included files use their IUIs as their file names. The pool cache preferably uses key/value lookup where an IUI is the key and the value is the bit sequence to be retrieved. If the file is found it is retrieved and the procedure ends.

If the file is not found locally in a pool cache, in step 806 the importer looks for the file in local conventional storage. For example, of the file is not included in pool cache where the IUI is the file name, it is possible that the file is still stored locally and its IUI is associated with the file in some other manner. For example, the IUI may be a file attribute of a file and all files on local conventional storage (such as memory, disk, tape) may be scanned to search for a file attribute that matches the identified IUI. As a last result, brute force method, local storage may be scanned to determine the contents of all files present and an IUI may be recalculated for all of these files. The identified IUI from step 802 may then be compared against each of these newly calculated IUIs to determine the correct file to be retrieved. If the file is found it is retrieved and the procedure ends.

If the file is not found in conventional storage, in step 808 a file location request is broadcast to peer computers on a local area network. A file request list that includes the IUI of the file and its sequence numbers may also be created. Preferably, the identified IUI is broadcast to all computers on the network that implement a pool cache. These computers may then determine if the desired file is present within their pool by examining the broadcast IUI. Additionally, it is possible for a peer computers to examine its local conventional storage using the techniques described above. If the file is found, the computer having the file returns a location indicator to the requesting computer indicating the network location of the desired file.

In step 810 the original computer establishes a one-to-one link with the computer that contains the desired file and requests a download of the file using a file request. In this embodiment, the file is downloaded segment by segment, although it is possible that the file may be downloaded all at once. In step 812 the originating computer receives a file data packet containing segment data for the desired file. The sequence number of the received file data packet is checked against the file request list to determine if the packet received is for a file that is desired. Suitable examples of a file request and file data packet are shown in the above referenced application Ser. Nos. 09/236,366 and 09/235,146.

If the data packet is needed for the current desired file, then in step 814 the segment data from the file data packet is stored as part of the desired file and the file request list is updated to indicate that this particular segment has been received. Step 818 checks whether the file is complete and all segments have been received. If so, the file has been fully retrieved and the procedure ends. If not, then the originating computer waits to receive another downloaded file data packet in step 812.

If, in step 808 the desired file was not found, then in step 818 the importer sends a request for the file to any pre-configured or well-known servers that implement a pool cache. For example, an importer may be pre-configured to connect to certain servers using an IP address if that server is known to implement a pool cache. By passing the IUI of the desired file to the particular server, the server may determine if the file is present within the pool cache by examining the file names of its files. Other addressing techniques may be used to form a connection with one of these servers. If the file is found it is retrieved and the procedure ends.

In step 808 these peer computers may be dedicated pool cache servers that are dedicated to collecting and storing files that are identified by their IUI. In this fashion, broadcasting to these pool servers is efficient in that there is a high likelihood that one of the servers has the desired file in its cache. The broadcast may also reach certain software agents located on the computers whose primary function is to generate the unique identifiers such as is described in FIGS. 4 and 8. These software agents may also store the files and their associated IUIs in a pool cache of their own or in local conventional storage.

If the file is not found in step 818 then in step 820 the importer looks for the desired file on any mounted volumes of file servers attached to the local area network. In this situation, the file servers identified may not necessarily implement a pool cache in a standard format, but nonetheless may store the desired file on a mounted volume such as in RAM, on disk, etc. The identified IUI may be used to find the desired file using any of the techniques discussed in step 802. If the file is found it is retrieved and the procedure ends. If the file is not found, then in step 822 the importer looks for the desired file on any suitable FTP server using a URL, for example. In this situation the FTP servers may be accessed over the Internet using a URL and are passed the IUI of the desired file. As the servers may not implement a pool cache in a standard format, any of the techniques described in step 802 may be used to find the desired file on the FTP server. If the file is found it is retrieved and the procedure ends.

If the file is not found, other techniques may be used such as making a request over a GSM telephone and retrieval via satellite, using a web search engine to find the file associated with an IUI etc. An error handler may be invoked in step 824 to return a suitable error message if necessary. Thus, the procedure of FIG. 11 describes a technique by wish a desired file is searched for in an efficient manner using its IUI. Local and likely places for the file are searched first while the remote and less likely places are searched later.

Examples of Use

The various embodiments described herein are suitable for use in a wide range of technical and business applications. For example, the invention is useful in the secure storage of documents, in access control, in escrow of documents, for encryption issues, and in reliably proving creation of documents. The following examples may be implemented using any of the embodiments described herein, for example the embodiment of FIG. 2, the embodiment of FIG. 3 or the embodiment of FIG. 7.

For any application, meta data 470 of flattened descriptor file 460 may be used to help an interested party search for and find content of interest. For example, consider a book whose chapters are encrypted and distributed on the Internet using an embodiment of the present invention. Meta data 470 may include keywords that help to describe the book, and locations where user MD5 may be found and payment made to receive key MD5. Thus, as the flattened descriptor file is not encrypted, an interested party can perform a search on the Internet for a book using author, subject or title keywords; if these keywords are present in meta data 470, then the party may retrieve the flattened descriptor file and eventually retrieve the book using embodiments described herein.

Figure 12:
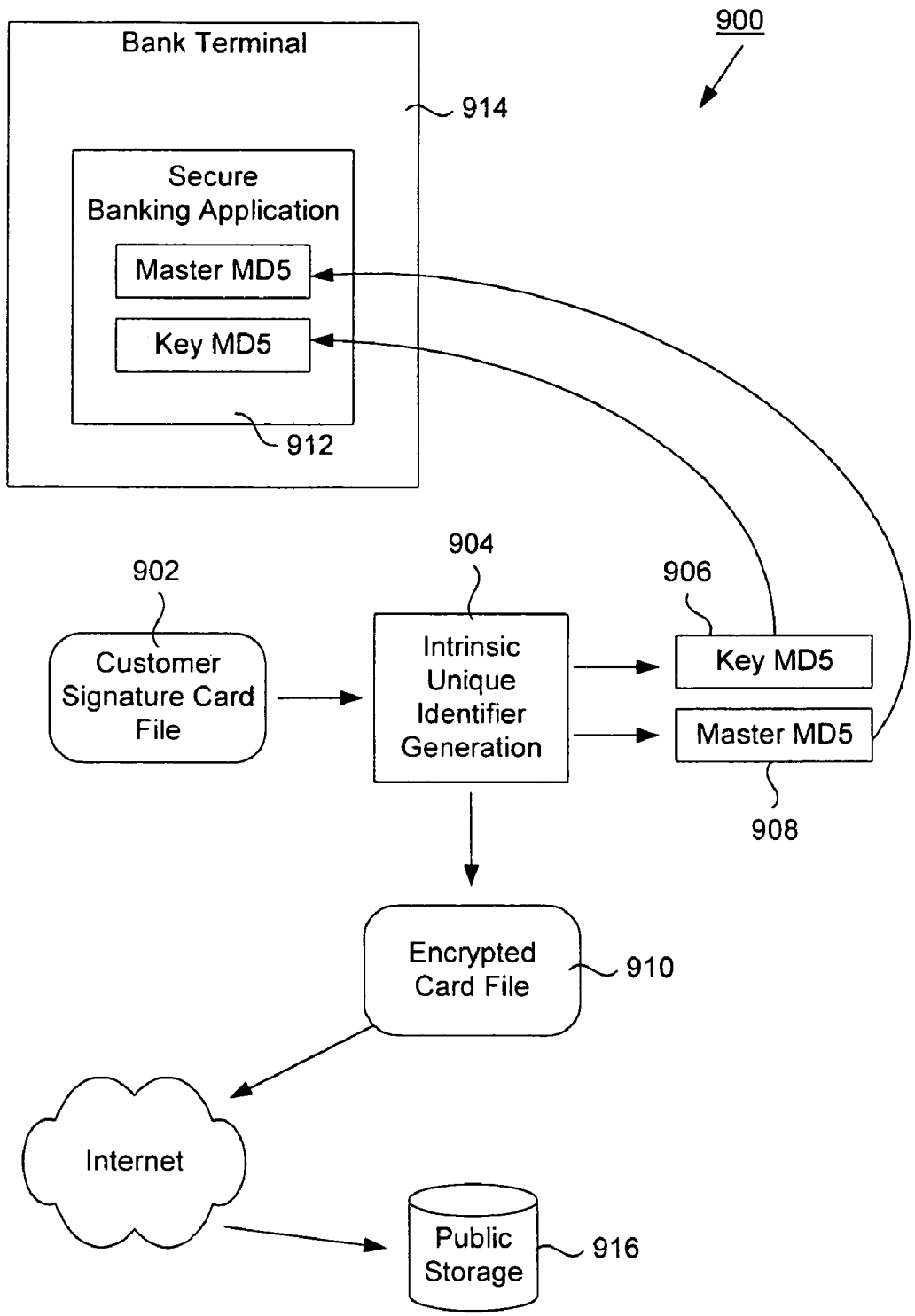
FIG. 12 is a block diagram illustrating a use of the invention in the area of secure storage.

In the area of the secure storage, it is often desirable to be able to store documents in a public location that may be easily accessed by certain entities but not allow the documents to be opened or read except by authorized parties. FIG. 12 is a block diagram illustrating a use of the invention in the secure storage area. In this example, a bank desires to digitize a customer's signature card and have it available for its distributed terminals to access and verify. One difficulty is that the card must be kept secure and not released to outside parties. The digital signature card file 902 is processed using an embodiment of the present invention 904 to produce a key MD5 906 and a master MD5 908. As part of the process an encrypted version of the card file 910 is also produced. When implemented using the embodiment of FIG. 2, key 906 corresponds to MD5 106 and master 908 corresponds to MD5 114. In the embodiment of FIG. 3, the card file may be combined with other file and/or bank or card meta data to produce a descriptor file which then yields key 906 and master 908. Key 906 and master 908 are then stored securely within a banking application 912 resident upon a bank terminal 914. Terminal 914 may be in communication with a bank mainframe that had originally calculated the MD5s and downloaded them to the terminal. In this example, security for this master and the key are the responsibility of the banking application.

The encrypted card file 910 may then be transferred over the Internet or some other data link to non-secure public storage 916. Because file 910 is encrypted, an outside party cannot read it even though it is stored in public storage. When application 112 has a need for a particular card file, it may then use key 906 and master 908 to retrieve the encrypted file from public storage 916 and decrypt it. Such a scenario is possible with multiple customer files and/or other types of documents. Other secure storage applications may be found in areas such as insurance and health.

Figure 13:
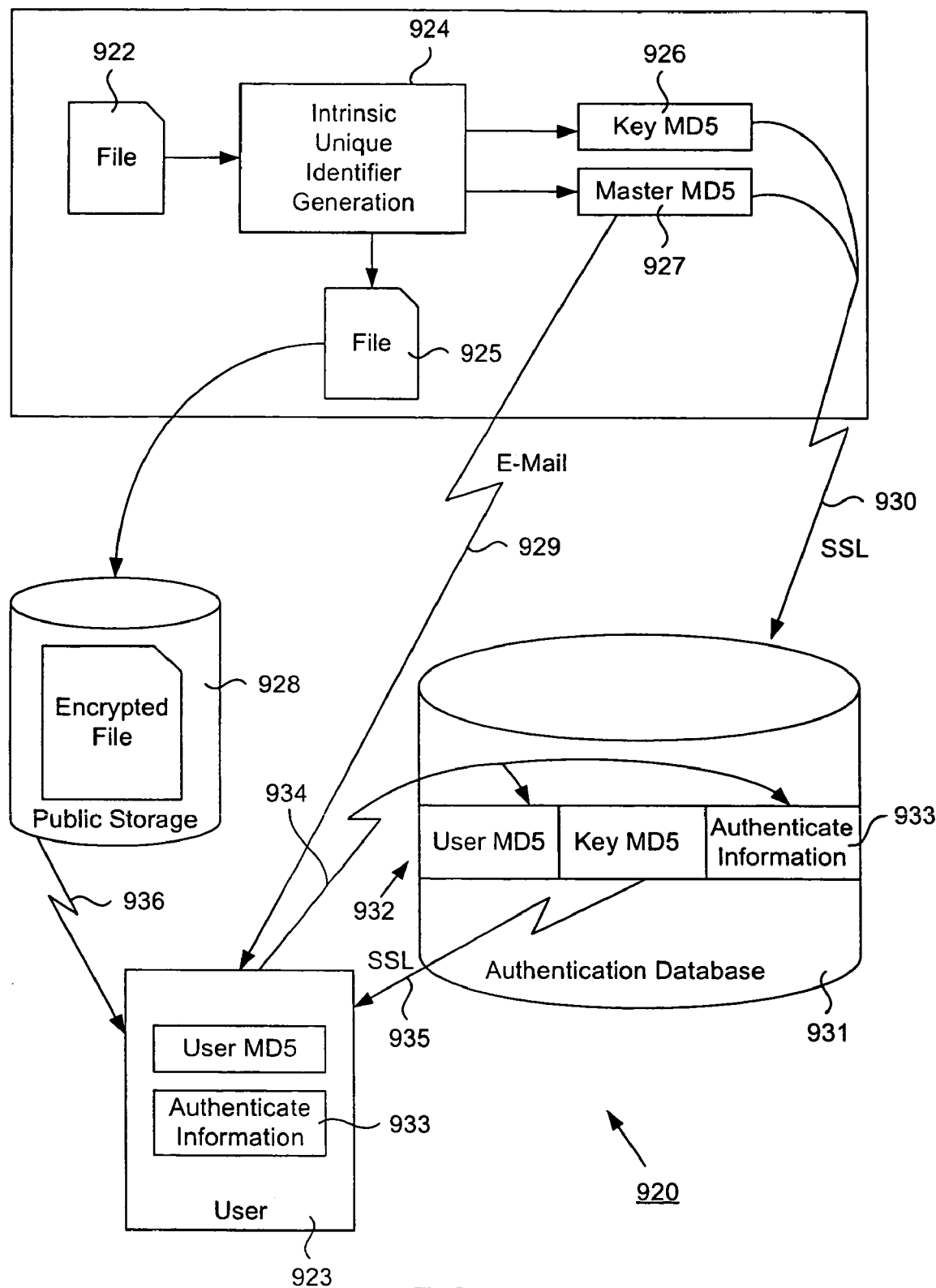
FIG. 13 is a block diagram illustrating use of an embodiment of the invention in the area of access control.

FIG. 13 is a block diagram illustrating use of an embodiment of the invention in the area of access control. Often an entity produces documents or information that it wishes to provide to an authorized user, but only upon authentication of that user. Further, an entity may not wish to perform the authentication itself, but may wish another to perform the authentication. In this example, originator 921 has produced a file 922 that it wishes user 923 to have access to, but only if user 923 can authenticate itself, or if a certain time has passed, or if other conditions are met. Using a suitable embodiment of the invention 924, file 922 is processed to produce an encrypted version 925, a key MD5 926 and a user MD5 927. If utilizing the embodiments shown in FIG. 2 or FIG. 3, user MD5 927 would correspond to encrypted MD5 114 or master MD5 146, respectively. Originator 921 is then free to transfer the encrypted file to public storage 928, to keep it itself, or even to deliver it to user 923. Because the file is encrypted, the user may not access it.

Next, user MD5 is delivered to the user via email 929, another data link, a telephone, or any other physical exchange medium. By possession of user MD5, user 923 may locate and retrieve the encrypted file but will not be able to decrypt it. Concurrently or thereafter, the two MD5s are transmitted to an authentication database 931 in a secure manner. For example, an Internet connection 930 using SSL may be used. A secure connection is preferred, as possession of both MD5s would allow any party to read the encrypted file. Database 931 may be present upon any suitable authentication server that acts an authenticating agent for originator 921. For example, the server may be an LDAP server and protocol 930 and 935 may be secure LDAP protocols. Both MD5s are stored in a record 932 of the database along with authentication information 933. Information 933 is any suitable information suitable for authenticating user 923, such as a password. The authentication server also contains any of a wide variety of authenticating mechanisms for authenticating outside parties. Such authentication mechanisms are well known in the art.

In order to access the encrypted file, user 923 delivers via a data link 934 both the user MD5 and the user's authentication information. The user MD5 serves as a record locator within the database to locate the correct key and authentication information. The authentication server next authenticates the user by comparing the authentication information or by performing some other well-known process. If authentic, the key MD5 is then delivered via a data link 935 back to user 923. Preferably, link 935 is a secure link such a an SSL protocol that protects the key. Once user 923 is in possession of key MD5, it may now decrypt the encrypted file directly, or by way of decrypting an encrypted descriptor file.

In this example, originator 921 may decide to revoke the user's privilege to view the file at any time by simply communicating with the authentication server. The server would then be directed to always to decline authentication for the user. Alternatively, record 932 may be associated with any number of users that might be authenticated to download key MD5.

In another area of access control, files embodying music may be delivered to a user over the Internet who is not allowed to access the files until he or she has paid. Using the embodiment of FIG. 3, for example, the encrypted files may be delivered with a master MD5, or with the encrypted descriptor file 142 itself. Once the user completes a credit card payment over the Internet, the issuing entity delivers key MD5 138 to the user which allows the user to decrypt the descriptor file. Once decrypted, the user has access to the plaintext MD5s which allows the user to decrypt the music files. Alternatively, the encrypted music files are not delivered to the user, but are located and retrieved by the user using the encrypted MD5 114 included in the descriptor file. Other examples in the area of access control in which this embodiment may be useful are publishing on the Internet.

Figure 14:
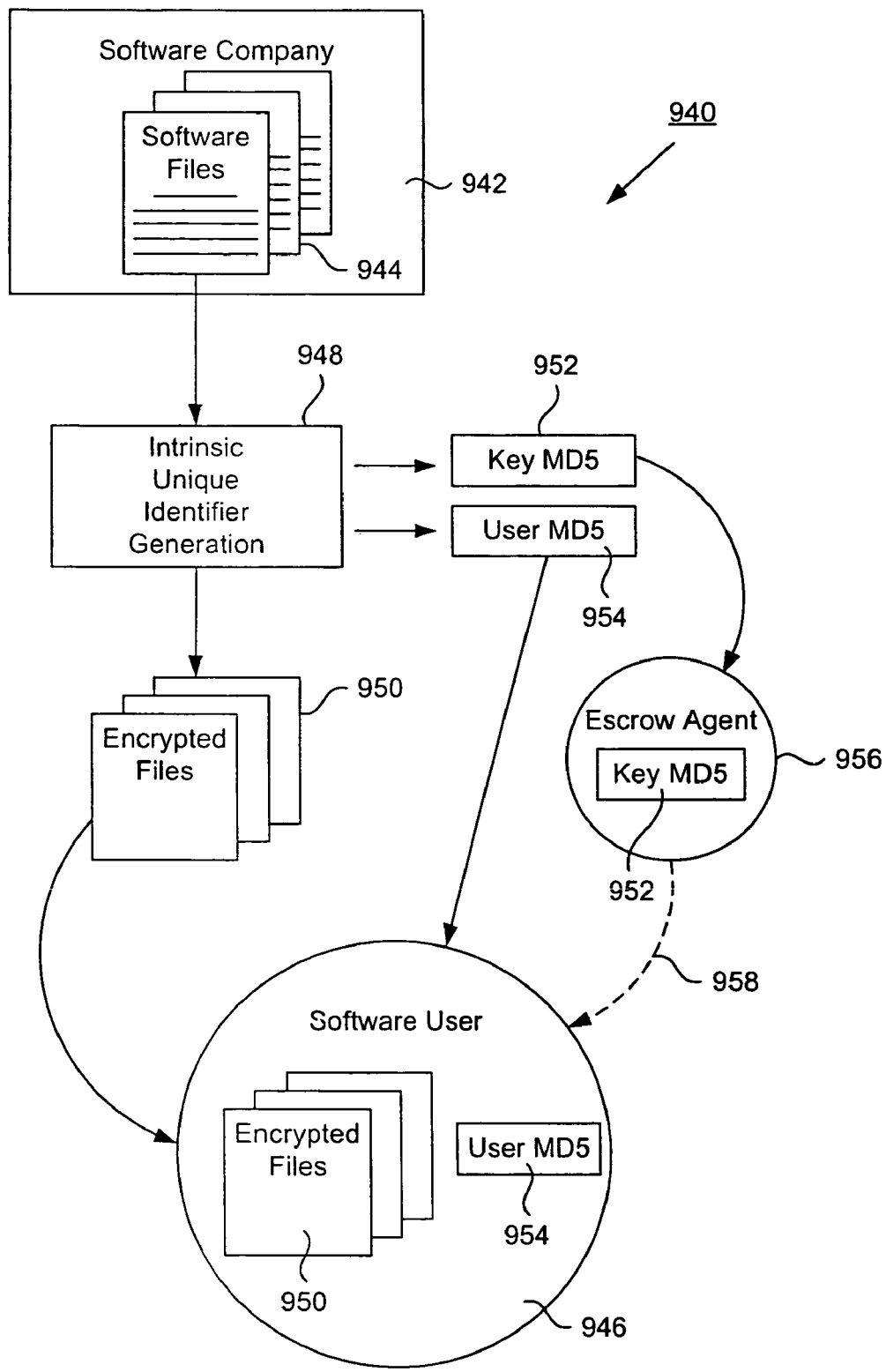
FIG. 14 is a block diagram illustrating use of an embodiment of the invention for escrow purposes.

FIG. 14 is a block diagram illustrating use of an embodiment of the invention for escrow purposes. A wide variety of information may be put into escrow such as experimental records, legal documents, government records, etc. In this example, software company 942 produces a software program in the form of a software file 944 which is used by a software user 946. For any of a number of reasons, both parties have agreed that the software files will put in to escrow for later access by the user if needed. The company, however, does not wish anyone to have access to the files unless the proper conditions are met. Accordingly, an embodiment of the invention 948 processes files 944 to produces encrypted files 950, a key MD5 952 and a user MD5 954. User MD5 is then provided to the software user. In the embodiment of FIG. 7, files 950 may be retrieved by the user using a flattened descriptor file, or the file may simply be delivered to the user from the software company. In the embodiment of FIG. 3, user MD5 corresponds to master MD5 146 and the encrypted files may be stored in a public location held by escrow agent 956, or may be even by delivered from the company to the user.

Key MD5 952 is delivered to escrow agent 956 who retains it until a condition previously agreed upon by the company and the user is met. Upon satisfaction of the condition, key 952 is delivered 958 to the user using any suitable means. Once in possession of the key, the user may decrypt an encrypted descriptor file to obtain the plaintext MD5s which will allow the user to decrypt and read the files 950. Thus, software escrow is made simpler.

In another example of escrow, a pharmaceutical company is in the process of getting a drug approved and is generating voluminous evidence and clinical data that it may need to provide to the FDA. The company may wish to speed up the approval process and insure that its massive amounts of data cannot be altered over time. The FDA, in a similar fashion, desires an assurance that such clinical data if held in escrow does not change over time. Using an embodiment of the present invention, a single MD5 (or other type of identifier) can represent an enormous amount of data and insure to the FDA that the documents originally used to create the MD5 have not changed since that time.

In this example, the company regularly generates a user MD5 and a key MD5 based upon any number of data files that the government may need to access. The user MD5 is then delivered to the FDA, at the same time the data files may be held by an escrow agent, put into public storage, or even delivered to the government. Because the company may wish to limit access to the data files should the approval process be abandoned, the files have previously been encrypted using an embodiment of the invention. Advantageously, should the company forgo the approval process, it may choose not to deliver the key MD5 to the FDA and as such the FDA (or anyone else) would be unable to decrypt the descriptor file.

At the end of the approval process, the company delivers the key MD5 to the FDA who may then use it in conjunction with the user MD5 to decrypt the data files and view them. The company is protected against anyone viewing their files prematurely. The FDA is protected against the data being changed in the meantime, because the user MD5 and the key MD5 guarantee that the files eventually decrypted are the ones that were originally used to create the user MD5 and they key MD5.

The present invention may also be used in situations where the government or other entity is concerned about an entity using encryption that is unbreakable. For national security reasons, the government may wish at some point to decrypt private party communications. In this example, the private party agrees to encrypt their communications using an embodiment of the present invention in which a key MD5 and a master MD5 (or a user MD5) are generated. The files that have been encrypted by the private party are delivered to public storage or to a government server for safekeeping. Based upon accepted legal principles and an agreement between the private party and the government, the key MD5 and the master MD5 are delivered to a suitable government agency for safekeeping. If at some future time it is legally determined that the communications of the private party must be decrypted, the government agency may release both the key MD5 and the master MD5 to an appropriate legal entity who would then be able to not only locate and access the files but to decrypt them. Further, due to the nature of the present invention, both parties are virtually assured that the files eventually decrypted are the original files making up the secret communications of the private party.

Embodiments of the present invention may also be used to prove the existence of records on a particular date. For example, consider an individual inventor who is working diligently to perfect an invention. His records include digital text files, digital drawings, and/or handwritten documents which may be digitized. On a particular date, the inventor uses an embodiment of the invention to create a key MD5 and a master MD5 (or a user MD5) for all of his records in the form of computer files. The single MD5 is then delivered to the Patent Office. The Patent Office logs the MD5 as being received on a certain date and keeps it for safekeeping. Both the master MD5 and the key MD5 remain with the individual inventor. The actual digital files (encrypted) may be kept by the inventor, placed in public storage, or even delivered to the government.

Should the inventor wish to abandon his invention and not disclose it, he simply need not provide the key MD5 to the Patent Office and the files would not be able to be decrypted. If the inventor desires to prove a date of conception some time later, the key MD5 is delivered to the Patent Office which then has the capability to locate and decrypt the inventor's original documents. By virtue of the original master MD5 being logged on particular date, it may be reliably be proven that the original documents that are eventually decrypted using the master MD5 and the key MD5 where in fact in existence on that earlier date.

In another example on how the present invention may be used to prove the existence of records on a particular date, consider a Notary Public with access to the Internet. A party who desires proof of the existence of a document on a particular date uses an embodiment of the invention to generate a unique MD5 for that document. For example, the embodiments of FIG. 2, FIG. 3 or FIG. 7 may be used, in which case the user generates MD5 114, master MD5 146 or user MD5 464. The user sends the MD5 (preferably encoded) to the Notary via electronic mail or some other suitable method on a particular date. The Notary receives the MD5, logs it, and notarizes it as being received on a particular date. At a later point in time, the corresponding key MD5 may be provided by the user to reliably prove that the document identified by the original MD5 was in existence on the date that the Notary received the original MD5.

A generated intrinsic unique identifier (IUI), such as an alphanumeric encoded MD5, may be embedded in, transported, or attached to a wide variety of physical objects. For example, either MD5 may be received embedded in an electronic mail message to specify a set of files. Alternatively, the MD5s may be generated automatically by a network device performing the backup of the files and directories specified. The MD5s may be produced by a business application, thus sealing the relevant digital information relating to a particular transaction. In addition, MD5s may be generated for other reasons by any user, network node, application or hardware device that needs to uniquely specify a file or group of files for some purpose. Such MD5s may be embedded in and readily accessed from database applications, legacy applications running on mainframes, text retrieval applications, web sites, etc.

Further, an IUI (such as an alphanumeric encoded MD5) might be placed into digital content to identify that content, authorize its use, address further information, etc. For example, a music file such as the MP3 format might mix in, "splice," or use a watermark to embed an IUI into the actual music file. Such an IUI might also be embedded into genetic material to reference further information about that genetic material.

An IUI might be attached physically to a physical object to provide a reference for extensive information about that object. For example, a bar code representing an IUI might be present on a home appliance and represent a user's manual. Or, the alphanumeric representation of an IUI may be present on an object; a user might then type the IUI into a computer to receive files over the Internet about that object.

An IUI might be present within memory of a computing device to reference much more extensive programming or data for that device. For example, consider a typical smart card with a memory capacity of 2 K bytes. This limited memory space is used for small programs and data. When inserted into a smart card terminal, such as an ATM, connections are made with other computing devices to execute the limited program and data stored on the smart card. To expand the usable program size, or the number of programs executable on a smart card, an IUI is embedded in memory of the smart card. The IUI uniquely identifies additional programs or data that can be loaded onto the smart card, or executed by the terminal or smart card. The same would work with other portable devices such as mobile telephones, personal digital assistants, etc.

Computer System Embodiment

Figure 15:
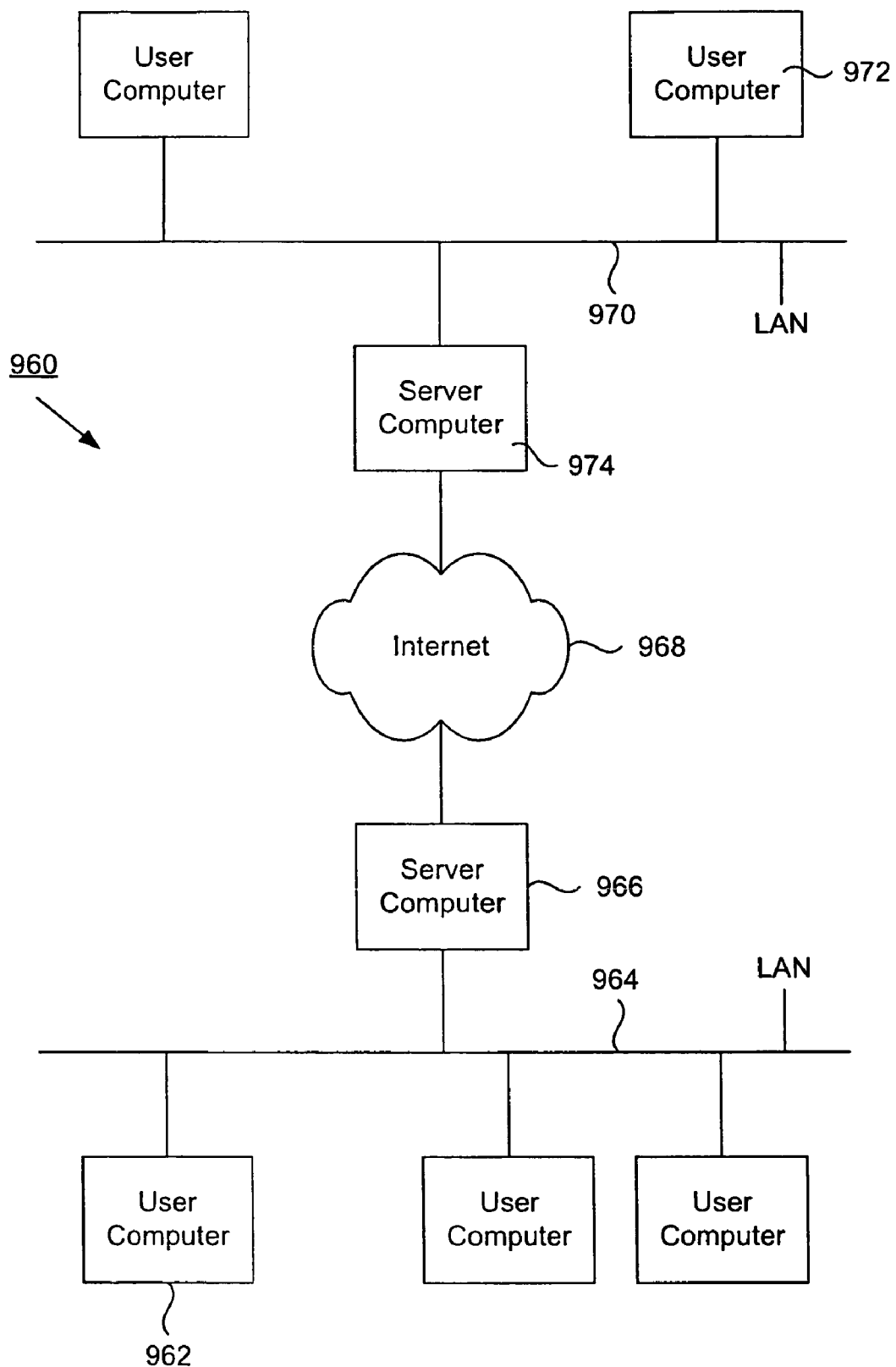
FIG. 15 is a block diagram illustrating a computer network environment suitable for use with an embodiment of the invention.

FIG. 15 is a block diagram illustrating a computer network environment suitable for use with an embodiment of the invention. User computer 962 connected to LAN 964 along with other computers access Internet 968 via a server computer 966. Connected thereto is another server computer 974 attached to LAN 970 that includes user computer 972. As embodied in a software program, agent software residing upon either computer 962 or 972 is arranged to implement the flows for FIGS. 4 and 8 and produce encrypted files, descriptor files and the intrinsic unique identifiers. The files and identifier may then be held locally or distributed throughout the network in any suitable fashion.

Figure 9:
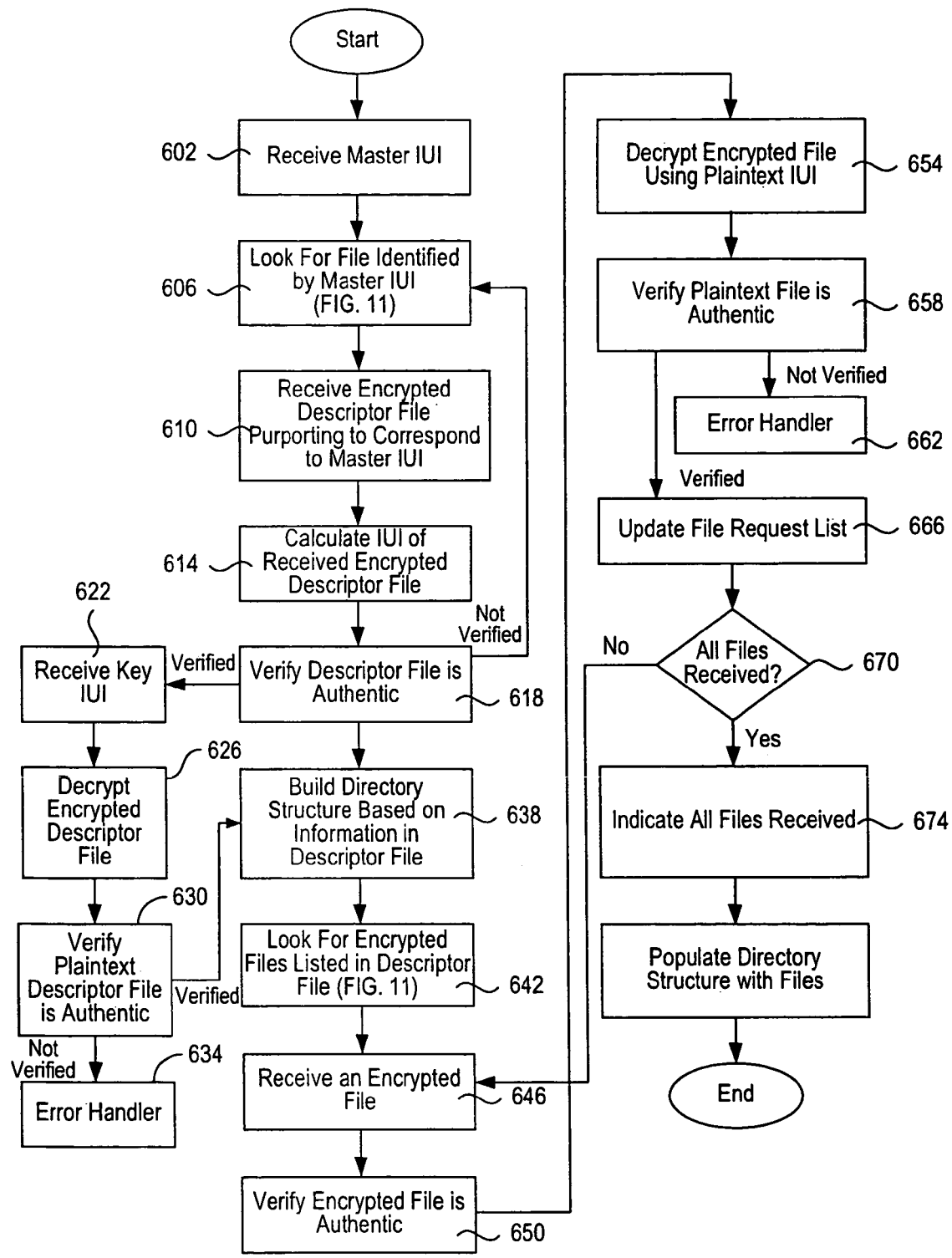
FIG. 9 is a flow diagram describing how files identified in FIGS. 2 and 3 may be retrieved.

When implementing the flows of FIG. 9 or 10, computer 972 includes agent software that identifies an intrinsic unique identifier and begins to look for it. If not found locally, the request for a file or files is handled by server computer 974 that implements server software. Such server software may implement the flows of FIGS. 9 and 10 and portions of FIG. 11 to look for, retrieve, decrypt and deliver the requested files to computer 972. In an alternative embodiment, the functions implemented by the agent software and the server software need not be separated, but may be embodied within a single software program that is present on one computer or any number of computers.

Figure 16:
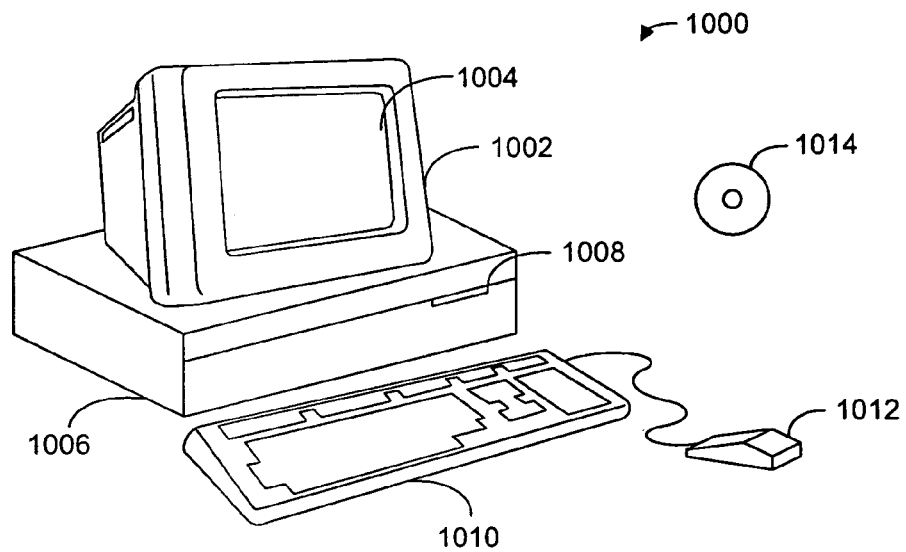
FIGS. 16 and 17 show one possible form of a computer system.
Figure 17:
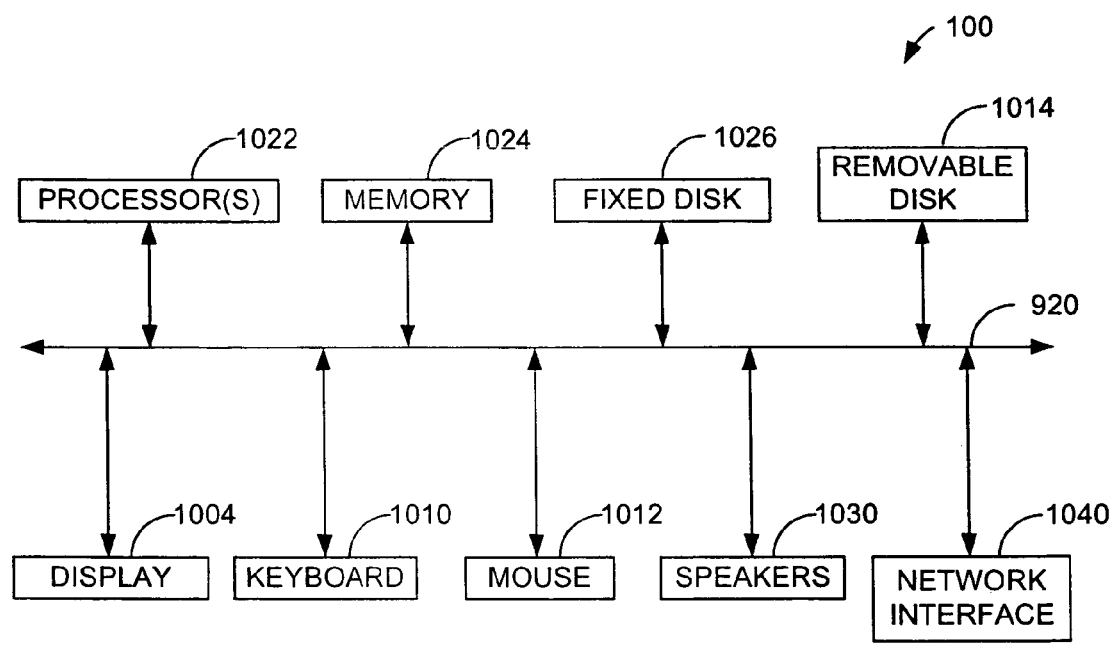

FIGS. 16 and 17 illustrate a computer system 1000 suitable for implementing any of the computers mentioned herein. FIG. 16 shows one possible physical form of the computer system. Of course, the computer system may have many physical forms ranging from an integrated circuit, a printed circuit board and a small handheld device up to a huge super computer. Computer system 1000 includes a monitor 1002, a display 1004, a housing 1006, a disk drive 1008, a keyboard 1010 and a mouse 1012. Disk 1014 is a computer-readable medium used to transfer data to and from computer system 1000.

FIG. 17 is an example of a block diagram for computer system 1000. Attached to system bus 1020 are a wide variety of subsystems. Processor(s) 1022 (also referred to as central processing units, or CPUs) are coupled to storage devices including memory 1024. Memory 1024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1026 is also coupled bi-directionally to CPU 1022; it provides additional data storage capacity and may also include any of the computer-readable media described below. Fixed disk 1026 may be used to store programs, data and the like and is typically a secondary storage medium (such as a hard disk) that is slower than primary storage. It will be appreciated that the information retained within fixed disk 1026, may, in appropriate cases, be incorporated in standard fashion as virtual memory in memory 1024. Removable disk 1014 may take the form of any of the computer-readable media described below.

CPU 1022 is also coupled to a variety of input/output devices such as display 1004, keyboard 1010, mouse 1012 and speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon CPU 1022 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For example, in the embodiment of FIG. 7, the key identifier could be provided first to a user, and then the master identifier later, instead of the other way around. Therefore, the described embodiments should be taken as illustrative and not restrictive, and the invention should not be limited to the details given herein but should be defined by the following claims and their full scope of equivalents.

The invention claimed is:

1. A method of managing a plurality of digital assets stored in a computer system comprising at least a first computer, the plurality of digital assets comprising a first digital asset, the first digital asset comprising content and having associated metadata, the method comprising acts of:
   (A) creating a customized first descriptor file that comprises content that includes at least some of the metadata associated with the first digital asset and an identifier of the first digital asset that is based, at least in part, on a cryptographic hash of at least some of the content of the first digital asset, the first descriptor file being a first type of descriptor file that is one of a plurality of customized descriptor file types created by a user, at least some metadata and behavior being automatically added to the first descriptor file based on the first descriptor file being of the first type, wherein the behavior that is automatically added to the first descriptor file based on the first descriptor file being of the first type is specified by the user and causes the first descriptor file to be placed in a particular folder based on the first descriptor file being of the first type, wherein the particular folder in which the first descriptor file is placed is specified by the user; and
   (B) storing the first descriptor file on the computer system in the particular folder so that the first descriptor file is accessible as one of the plurality of digital assets and creating an identifier of the first descriptor file that is based, at least in part, on a cryptographic hash of at least some of the content of the first descriptor file.

2. The method of claim 1, wherein the plurality of digital assets comprises a second digital asset, the second digital asset comprising data and having associated metadata, and wherein the method further comprises acts of:
   (C) creating a second descriptor file that comprises at least some of the metadata associated with the second digital asset, the second descriptor file being a second type of descriptor file, at least some metadata being automatically added to the second descriptor file based on the second descriptor file being of the second type, wherein the at least some metadata automatically added to the second descriptor file differs in at least some respects from the at least some metadata automatically added to the first descriptor file; and (D) storing the second descriptor file on the computer system so that the second descriptor file is accessible as one of the plurality of digital assets.

3. The method of claim 1, wherein the first computer manages storage of the first digital asset, wherein the computer system further comprises a second computer having an application program that generates the first digital asset, and wherein the act (B) comprises an act of storing the first descriptor file in a manner that enables the first descriptor file to be accessed by the application program.

4. The method of claim 1, wherein the act (B) comprises an act of storing the first descriptor file as a file on the computer system.

5. The method of claim 1, further comprising an act of:

(C) creating a unique identifier for the first descriptor file, the unique identifier comprising information that identifies the first descriptor file as belonging to a class of digital assets that comprise metadata relating to other digital assets.

6. The method of claim 5, further comprising an act of:

(D) creating a unique identifier for the first digital asset, the unique identifier for the first digital asset comprising information that identifies the first digital asset as belonging to a class of digital assets that do not comprise metadata relating to other digital assets.

7. The method of claim 1, wherein the first computer is a silo that manages storage of the first digital asset.

8. The method of claim 1, wherein the first computer is a file server that manages storage of the first digital asset.

9. The method of claim 1, wherein the first computer is a storage system that manages storage of the first digital asset.

10. The method of claim 1, wherein the computer system comprises a plurality of computers in addition to the first computer, wherein the plurality of computers are interconnected by at least one network, and wherein each of the plurality of computers manages storage of one or more of the plurality of digital assets.

11. The method of claim 1, wherein the computer system further comprises a second computer and at least one network, and wherein the first and second computers are peer computers coupled by the at least one network.

12. The method of claim 1, wherein the first computer manages storage of the second digital asset, and wherein the act (B) comprises an act of storing the second digital asset on the first computer.

13. The method of claim 1, wherein the first computer manages storage of the second digital asset, and wherein the act (B) comprises an act of storing the second digital asset on a storage device managed by the first computer.

14. The method of claim 1, wherein the act (A) comprises an act of creating the descriptor file to include at least one searchable keyword associated with the first digital asset.

15. The method of claim 14, wherein the at least one searchable keyword is descriptive of the first digital asset.

16. The method of claim 1, wherein the act (A) comprises creating the first descriptor file to comprise at least some metadata added to the first descriptor file based on the first descriptor file being of the first type.

17. The method of claim 16, wherein the act (A) comprises creating the first descriptor file to comprise at least some metadata automatically added to the first descriptor file based on the first descriptor file being of the first type.

18. The method of claim 16, wherein the act (A) comprises creating the first descriptor file to comprise at least some metadata added to the first descriptor file, in response to a prompt of a user of the computer system, based on the first descriptor file being of the first type.

19. The method of claim 1, wherein the act (A) comprises creating the first descriptor file to comprise at least one behavior added to the first descriptor file based on the first descriptor file being of the first type.

20. At least one non-transitory computer readable medium encoded with instructions that, when executed on a computer system, perform a method of managing a plurality of digital assets stored in the computer system, wherein the computer system comprises at least a first computer, the plurality of digital assets comprising a first digital asset, the first digital asset comprising content and having associated metadata, the method comprising acts of:

(A) creating a customized first descriptor file that comprises content that includes at least some of the metadata associated with the first digital asset and an identifier of the first digital asset that is based, at least in part, on a cryptographic hash of at least some of the content of the first digital asset, the first descriptor file being a first type of descriptor file that is one of a plurality of customized descriptor file types created by a user, at least some metadata and behavior being automatically added to the first descriptor file based on the first descriptor file being of the first type, wherein the behavior that is automatically added to the first descriptor file based on the first descriptor file being of the first type is specified by the user and causes the first descriptor file to be placed in a particular folder based on the first descriptor file being of the first type, wherein the particular folder in which the first descriptor file is placed is specified by the user; and (B) storing the first descriptor file on the computer system in the particular folder so that the first descriptor file is accessible as one of the plurality of digital assets and creating an identifier of the first descriptor file that is based, at least in part, on a cryptographic hash of at least some of the content of the first descriptor file.

21. The at least one non-transitory computer readable medium of claim 20, wherein the plurality of digital assets comprises a second digital asset, the second digital asset comprising data and having associated metadata, and wherein the method further comprises acts of:

(C) creating a second descriptor file that comprises at least some of the metadata associated with the second digital asset, the second descriptor file being a second type of descriptor file, at least some metadata being automatically added to the second descriptor file based on the second descriptor file being of the second type, wherein the at least some metadata automatically added to the second descriptor file differs in at least some respects from the at least some metadata automatically added to the first descriptor file; and (D) storing the second descriptor file on the computer system so that the second descriptor file is accessible as one of the plurality of digital assets.

22. The at least one non-transitory computer readable medium of claim 20, wherein the first computer manages storage of the first digital asset, wherein the computer system further comprises a second computer having an application program that generates the first digital asset, and wherein the act (B) comprises an act of storing the first descriptor file in a manner that enables the first descriptor file to be accessed by the application program.

23. The at least one non-transitory computer readable medium of claim 20, wherein the act (B) comprises an act of storing the first descriptor file as a file on the computer system.

24. The at least one non-transitory computer readable medium of claim 20, wherein the method further comprises an act of:
(C) creating a unique identifier for the first descriptor file, the unique identifier comprising information that identifies the first descriptor file as belonging to a class of digital assets that comprise metadata relating to other digital assets.

25. The at least one non-transitory computer readable medium of claim 24, wherein the method further comprises an act of:
(D) creating a unique identifier for the first digital asset, the unique identifier for the first digital asset comprising information that identifies the first digital asset as belonging to a class of digital assets that do not comprise metadata relating to other digital assets.

26. The at least one non-transitory computer readable medium of claim 20, wherein the first computer is a silo that manages storage of the first digital asset.

27. The at least one non-transitory computer readable medium of claim 20, wherein the first computer is a file server that manages storage of the first digital asset.

28. The at least one non-transitory computer readable medium of claim 20, wherein the first computer is a storage system that manages storage of the first digital asset.

29. The at least one non-transitory computer readable medium of claim 20, wherein the computer system comprises a plurality of computers in addition to the first computer, wherein the plurality of computers are interconnected by at least one network, and wherein each of the plurality of computers manages storage of one or more of the plurality of digital assets.

30. The at least one non-transitory computer readable medium of claim 20, wherein the computer system further comprises a second computer and at least one network, and wherein the first and second computers are peer computers coupled by the at least one network.

31. The at least one non-transitory computer readable of claim 20, wherein the first computer manages storage of the second digital asset, and wherein the act (B) comprises an act of storing the second digital asset on the first computer.

32. The at least one non-transitory computer readable medium of claim 20, wherein the first computer manages storage of the second digital asset, and wherein the act (B) comprises an act of storing the second digital asset on a storage device managed by the first computer.

33. The at least one non-transitory computer readable medium of claim 20, wherein the act (A) comprises an act of creating the descriptor file to include at least one searchable keyword associated with the first digital asset.

34. The at least one non-transitory computer readable medium of claim 33, wherein the at least one searchable keyword is descriptive of the first digital asset.

35. The at least one non-transitory computer readable medium of claim 20, wherein the act (A) comprises creating the first descriptor file to comprise at least some metadata added to the first descriptor file based on the first descriptor file being of the first type.

36. The at least one non-transitory computer readable medium of claim 35, wherein the act (A) comprises creating the first descriptor file to comprise at least some metadata automatically added to the first descriptor file based on the first descriptor file being of the first type.

37. The at least one non-transitory computer readable medium of claim 35, wherein the act (A) comprises creating the first descriptor file to comprise at least some metadata added to the first descriptor file, in response to a prompt of a user of the computer system, based on the first descriptor file being of the first type.

38. The at least one non-transitory computer readable medium of claim 20, wherein the act (A) comprises creating the first descriptor file to comprise at least one behavior added to the first descriptor file based on the first descriptor file being of the first type.

39. At least one computer, in a computer system, for managing a plurality of digital assets stored in the computer system, wherein the plurality of digital assets comprising a first digital asset, the first digital asset comprising content and having associated metadata, the at least one computer comprising:
at least one storage device; and
at least one controller, coupled to the at least one storage device, that:
(A) creates a customized first descriptor file that comprises content that includes at least some of the metadata associated with the first digital asset and an identifier of the first digital asset that is based, at least in part, on a cryptographic hash of at least some of the content of the first digital asset, the first descriptor file being a first type of descriptor file that is one of a plurality of customized descriptor file types created by a user, at least some metadata and behavior being automatically added to the first descriptor file based on the first descriptor file being of the first type, wherein the behavior that is automatically added to the first descriptor file based on the first descriptor file being of the first type is specified by the user and causes the first descriptor file to be placed in a particular folder based on the first descriptor file being of the first type, wherein the particular folder in which the first descriptor file is placed is specified by the user; and
(B) stores, on the at least one storage device, the first descriptor file in the particular folder so that the first descriptor file is accessible as one of the plurality of digital assets and creates an identifier of the first descriptor file that is based, at least in part, on a cryptographic hash of at least some of the content of the first descriptor file.

40. The at least one computer of claim 39, wherein the plurality of digital assets comprises a second digital asset, the second digital asset comprising data and having associated metadata, and wherein the at least one controller:
(C) creates a second descriptor file that comprises at least some of the metadata associated with the second digital asset, the second descriptor file being a second type of descriptor file, at least some metadata being automatically added to the second descriptor file based on the second descriptor file being of the second type, wherein the at least some metadata automatically added to the second descriptor file differs in at least some respects from the at least some metadata automatically added to the first descriptor file; and
(D) stores the second descriptor file on the at least one storage device so that the second descriptor file is accessible as one of the plurality of digital assets.

41. The at least one computer of claim 39, wherein the at least one computer is a first computer and wherein the computer system further comprises a second computer having an application program that generates the first digital asset, and wherein the at least one controller stores the first descriptor file in a manner that enables the first descriptor file to be accessed by the application program.

42. The at least one computer of claim 39, wherein the, at least one controller stores the first descriptor file as a file on the computer system.

43. The at least one computer of claim 39, wherein the at least one controller:
   (C) creates a unique identifier for the first descriptor file, the unique identifier comprising information that identifies the first descriptor file as belonging to a class of digital assets that comprise metadata relating to other digital assets.

44. The at least one computer of claim 43, wherein the at least one controller:
   (D) creates a unique identifier for the first digital asset, the unique identifier for the first digital asset comprising information that identifies the first digital asset as belonging to a class of digital assets that do not comprise metadata relating to other digital assets.

45. The at least one computer of claim 39, wherein the at least one computer is a silo that manages storage of the first digital asset.

46. The at least one computer of claim 39, wherein the at least one computer is a file server that manages storage of the first digital asset.

47. The at least one computer of claim 39, wherein the at least one computer is a storage system that manages storage of the first digital asset.

48. The at least one computer of claim 39, wherein the computer system comprises a plurality of computers in addition to the at least one computer, wherein the plurality of computers are interconnected by at least one network, and wherein each of the plurality of computers manages storage of one or more of the plurality of digital assets.

49. The at least one computer of claim 39, wherein the at least one computer is a first computer and wherein the computer system further comprises a second computer and at least one network, and wherein the first and second computers are peer computers coupled by the at least one network.

50. The at least one computer of claim 39, wherein the at least one computer manages storage of the second digital asset, and wherein the at least one controller stores the second digital asset on the at least one storage device.

51. The at least one computer of claim 39, wherein the at least one computer manages storage of the second digital asset, and wherein the at least one controller stores the second digital asset on the at least one storage device.

52. The at least one computer of claim 39, wherein the at least one controller creates the descriptor file to include at least one searchable keyword associated with the first digital asset.

53. The at least one computer of claim 52, wherein the at least one searchable keyword is descriptive of the first digital asset.

54. The at least one computer of claim 39, wherein the at least one controller creates the first descriptor file to comprise at least some metadata added to the first descriptor file based on the first descriptor file being of the first type.

55. The at least one computer of claim 54, wherein the at least one controller creates the first descriptor file to comprise at least some metadata automatically added to the first descriptor file based on the first descriptor file being of the first type.

56. The at least one computer of claim 54, wherein the at least one controller creates the first descriptor file to comprise at least some metadata added to the first descriptor file, in response to a prompt of a user of the computer system, based on the first descriptor file being of the first type.

57. The at least one computer of claim 39, wherein the at least one controller creates the first descriptor file to comprise at least one behavior added to the first descriptor file based on the first descriptor file being of the first type.

* * * * *